United States Patent
Lyons et al.

(10) Patent No.: US 10,448,578 B2
(45) Date of Patent: Oct. 22, 2019

(54) SELECTIVE AUTOMATED BLOSSOM THINNING

(71) Applicant: THE PENN STATE RESEARCH FOUNDATION, University Park, PA (US)

(72) Inventors: David Lyons, Lafayette, LA (US); Paul Heinemann, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 117 days.

(21) Appl. No.: 14/804,933

(22) Filed: Jul. 21, 2015

(65) Prior Publication Data
US 2016/0057940 A1 Mar. 3, 2016

Related U.S. Application Data

(60) Provisional application No. 62/026,951, filed on Jul. 21, 2014.

(51) Int. Cl.
| | |
|---|---|
| *A01G 3/08* | (2006.01) |
| *A01B 41/06* | (2006.01) |
| *A01D 46/30* | (2006.01) |
| *A01G 3/02* | (2006.01) |
| *A01G 3/037* | (2006.01) |
| *A01G 3/00* | (2006.01) |

(52) U.S. Cl.
CPC .............. *A01G 3/02* (2013.01); *A01B 41/06* (2013.01); *A01D 46/30* (2013.01); *A01G 3/037* (2013.01); *A01G 2003/005* (2013.01)

(58) Field of Classification Search
CPC ........ A01B 41/00; A01B 41/06; A01D 46/30; A01G 3/00; A01G 2003/005
USPC .................. 47/1.43; 56/10.2 A, 327.1, 328.1
See application file for complete search history.

(56) References Cited

U.S. PATENT DOCUMENTS

| | | | |
|---|---|---|---|
| 2,645,893 A | | 7/1953 | Horst, Jr. |
| 4,532,757 A | * | 8/1985 | Tutle ..................... A01D 46/24 |
| | | | 382/110 |

(Continued)

OTHER PUBLICATIONS

The Penn State Research Foundation, "International Search Report and Written Opinion", Application No. PCT/US15/41361, Filed Jul. 21, 2015, dated Jan. 14, 2016, 9 pages.

(Continued)

*Primary Examiner* — David J Parsley
(74) *Attorney, Agent, or Firm* — McKee, Voorhees & Sease, PLC

(57) ABSTRACT

The invention relates to an end-effector device and automated selective thinning system. The system includes vision acquisition hardware, kinematic targeting and heuristic programming, a robotic arm, and a pomologically designed end-effector. The system is utilized to improve efficiency for the fruit-thinning process in a tree orchard, such as peach thinning By automating the mechanical process of fruit thinning, selective fruit-thinners can eliminate manual labor inputs and further enhance favorable blossom removal. Automation used in conjunction with a heuristic approach provides improvements to the system. The system may also be configured as a robotic arm or as a handheld system by including a battery and switching microcontroller with handle or wrist straps. Handheld thinning devices that are mechanical in nature may also be part of the system.

14 Claims, 43 Drawing Sheets

(56) References Cited

U.S. PATENT DOCUMENTS

| | | | | |
|---|---|---|---|---|
| 4,663,925 | A * | 5/1987 | Terada | A01D 46/24 |
| | | | | 382/153 |
| 4,718,223 | A * | 1/1988 | Suzuki | A01D 46/30 |
| | | | | 56/328.1 |
| 6,846,029 | B1 * | 1/2005 | Ragner | B25B 9/00 |
| | | | | 294/219 |
| 7,854,108 | B2 * | 12/2010 | Koselka | A01D 46/30 |
| | | | | 56/10.2 A |
| 8,666,552 | B2 * | 3/2014 | Zeelen | A01D 46/30 |
| | | | | 700/259 |
| 9,226,446 | B2 * | 1/2016 | Moore | A01D 46/24 |
| 9,480,202 | B2 * | 11/2016 | Pitzer | A01D 46/30 |
| 2009/0293442 | A1 * | 12/2009 | Chang | A01D 46/26 |
| | | | | 56/328.1 |
| 2011/0022231 | A1 * | 1/2011 | Walker | A01D 46/264 |
| | | | | 700/259 |
| 2013/0204437 | A1 | 8/2013 | Koselka et al. | |
| 2014/0250852 | A1 * | 9/2014 | Palm | A01D 46/28 |
| | | | | 56/328.1 |

OTHER PUBLICATIONS

Yang, Fu Ou, "Development of a Table-Top Robot Model for Thinning of Fruit", Thesis, University of Illinois at Urbana-Champaign, 2012, 84 pages.

Heinemann, Paul, "Advanced Technologies for Thinning of Tree Fruit", Penn State Dept. of Ag & Biol. Engineering, Mar. 12, 2013, 63 pages.

* cited by examiner

Heuristic algorithm

General Case - Saturn - 5..8..5..8 [cm] Distribution

Each 5 cm section will retain 2 blossom pairs

SELECTIVE AUTOMATED BLOSSOM THINNING

CROSS-REFERENCE TO RELATED APPLICATIONS

This application claims priority under 35 U.S.C. § 119 to provisional application Ser. No. 62/026,951, filed Jul. 21, 2014, herein incorporated by reference in its entirety.

GRANT REFERENCE

This invention was made with government support under Contract No. 2008-51180-19561, awarded by the United States Department of Agriculture and under Hatch Act Project Nos. PEN04547 and PEN04282, awarded by the United States Department of Agriculture/NIFA. The Government has certain rights in the invention.

FIELD OF THE INVENTION

The present invention relates to selective automated blossom thinning. More specifically, but not exclusively, the present invention relates to a selective automated blossom thinner, system and method.

BACKGROUND OF THE INVENTION

The specialty crop production industry is a cornerstone of the U.S. agricultural economy. Since the turn of the twenty-first century, specialty crop production has accounted for over 41.2 percent of U.S. cropland value of production. Producers and handlers of fruits, tree nuts, vegetables, melons, potatoes, and nursery crops comprise the multifaceted specialty crop production industry. At the forefront of this industry is tree fruit production, which accounts for 35.3 percent of U.S. specialty crop consumption per capita and generated nearly 15 billion dollars in annual revenue in 2010 alone. These tree fruit crops are some of the most labor intensive crops to produce. The variable production labor overhead includes the pruning, thinning and harvesting processes. The blossom thinning or green fruit thinning has been in practice for hundreds of years; it is a complex, time sensitive procedure, which reduces fruit branch loading, resulting in a higher quality, larger sized product.

Too many blossoms and/or fruits per tree can result in small fruit size, poor quality, and breakage of limbs. Traditionally, this process has been accomplished by hand or manual labor. However, a variety of chemical and mechanized thinning methods have been explored to reduce labor requirements. However, chemical thinning techniques have been proven unsafe and caustic in particular fruits, such as peaches, and is not an option for growers. Conversely, mechanical thinning and/or mechanized thinning studies have shown improved production efficiency while maintaining canopy integrity.

SUMMARY OF THE INVENTION

Therefore, it is a primary object, feature, and/or advantage of the invention to continue to improve upon the state of art for mechanized fruit thinning.

Another object, feature, and/or advantage of the present invention is to selectively remove blossoms and immature fruit based on branch length, blossom size, distance from trunk, and other like optimization parameters.

A still further object, feature, and/or advantage of the present invention is to employ heuristic blossom thinning methods that will result in ideally loaded branches for optimization of product growth.

One other object, feature, and/or advantage of the present invention is to develop a selective, fully automated, mechanized thinning system for fruit blossoms, such as peach blossoms.

Another object, feature, and/or advantage of the present invention is to visualize the tree fruit canopy, discriminate targets, mechanically reach the canopy from a stable platform and remove unwanted targets.

One or more of these and/or other objects, features or advantages of the present invention will become apparent from the specification and claims that follow.

The present invention provides selective automated blossom thinning. More specifically, but not exclusively, the present invention relates to a selective automated blossom thinner, system and method.

One exemplary embodiment provides a selective automated blossom thinning system. The system can include a robotic arm having proximal and distal portions articulable relative to each other by one or more interconnected members. An end-effector can be included at the distal portion of the robotic arm. The end-effector can have one or more fruit blossom thinning elements movable between open and closed positions for receiving and removing selected fruit blossoms. At least one input to a control on the arm from an acquisition device can be used to position the end-effector proximate one or more fruit blossoms, which can be heuristically selected by a computer-executed algorithm for removal from a plurality of fruit blossoms.

Another embodiment provides a selective automated blossom thinner. The blossom thinner can include a pair of opposing blossom thinning elements. A carriage of the blossom thinner can have a linear transversal assembly and an element actuator assembly. In a first position of the carriage the pair of opposing blossom thinning elements are in at least partial contacting engagement. In a second position of the carriage the pair of opposing blossom thinning elements are separated. A robotic arm can be operably connected to the carriage.

Yet another embodiment provides an automated method for blossom thinning. In one aspect, blossom thinning elements can be mounted on a carriage with a linear transversal assembly and element actuator assembly. A location of one or more blossoms can be heuristically approximated. Actuating the linear transversal assembly can move blossom thinning elements between open and closed positions for receiving one or more blossoms. Selected one or more fruit blossoms can be removed with the element actuator assembly.

BRIEF DESCRIPTION OF THE DRAWINGS

Illustrated embodiments of the present invention are described in detail below with reference to the attached drawing figures, which are incorporated by reference herein, and where.

Figure 1:
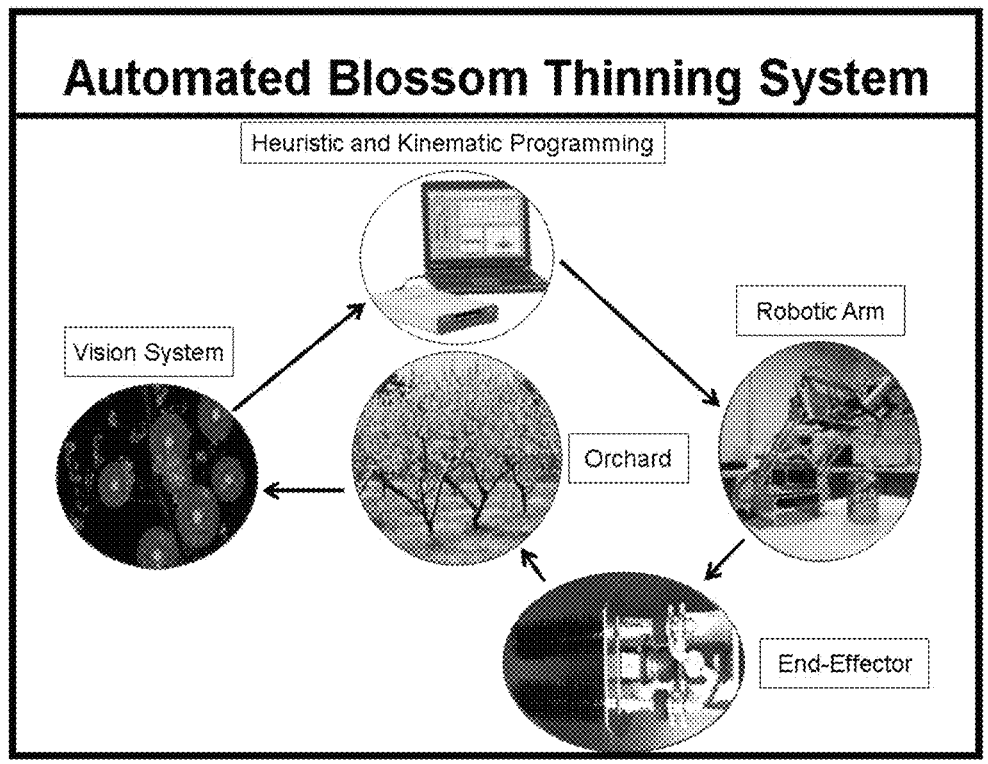
FIG. 1 is a pictorial representation of an overview in accordance with an illustrative embodiment.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

According to at least some aspects, selective automated blossom thinning can consist of: vision acquisition hardware, kinematic targeting and heuristic programming, a robotic arm and a pomologically designed end-effector. This system is shown in FIG. 1.

Figure 2:
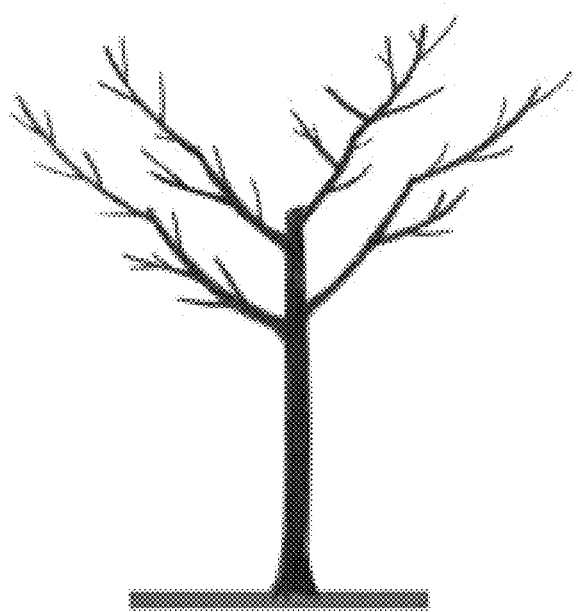
FIG. 2 is a pictorial representation of a tree structure in accordance with an illustrative embodiment.
Figure 3:
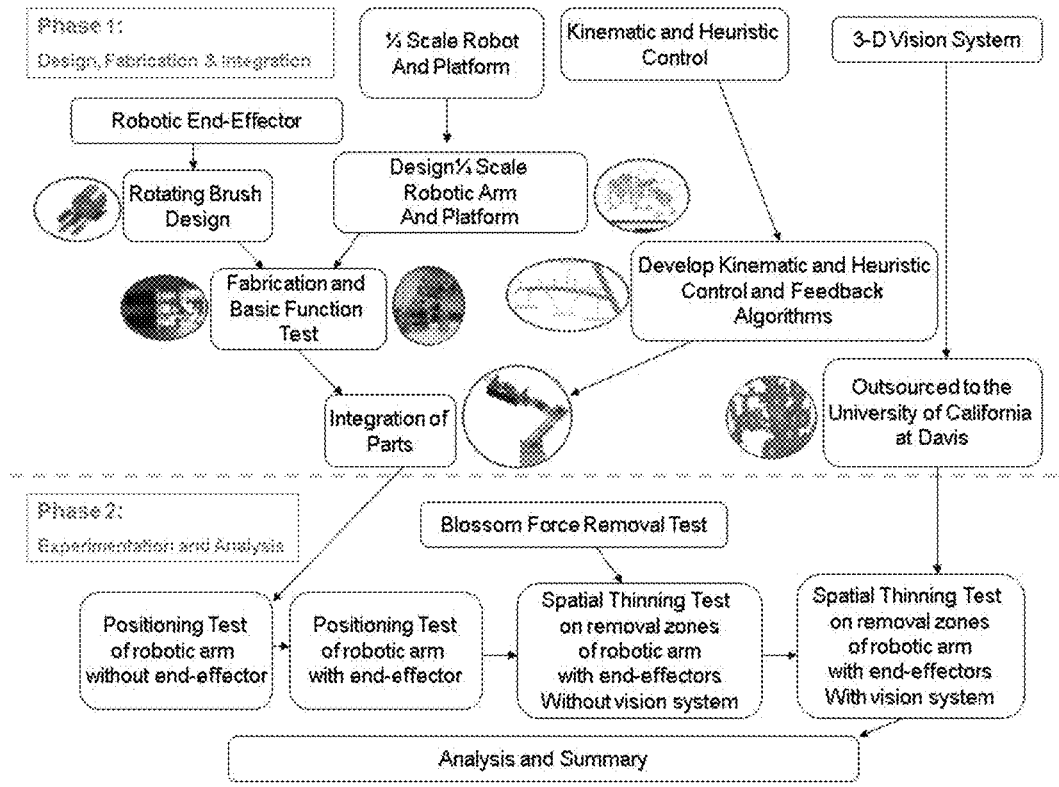
FIG. 3 is a pictorial representation of a flow chart of methodology for automated selective blossom thinning.

A methodology can be employed to investigate automated selective blossom thinning using robotic controlled end-effectors with a 3-D vision target acquisition system for various fruit tree scaffold types, such as the open vase tree shown in FIG. 2. Other scaffold types such as KAC-V and Y-trained tree systems are contemplated. A study of such an investigation can be divided into two phases: the design, fabrication and integration phase and the experimental and statistical analysis phase (FIG. 3).

According to at least some aspects of a system for selectively thinning blossoms, an industrial grade robotic arm (FIG. 3) can be used. The Figure shows the use of an FANUC M-16iL, which is a double-jointed robotic arm, with six axes of rotation. The M-16iL was designed primarily for repetitive industrial tasks. However, an automation process for the selective automated thinning of blossoms requires a programmable robotic unit and/or robotic controller which would accept 'real time' Cartesian coordinate data for transversal paths about a chosen target area. The M-16iL robotic arm does not have this capability. Therefore, two different methods can be implemented for circumventing the robotic arm's motors and motor controller signals.

Figure 4:
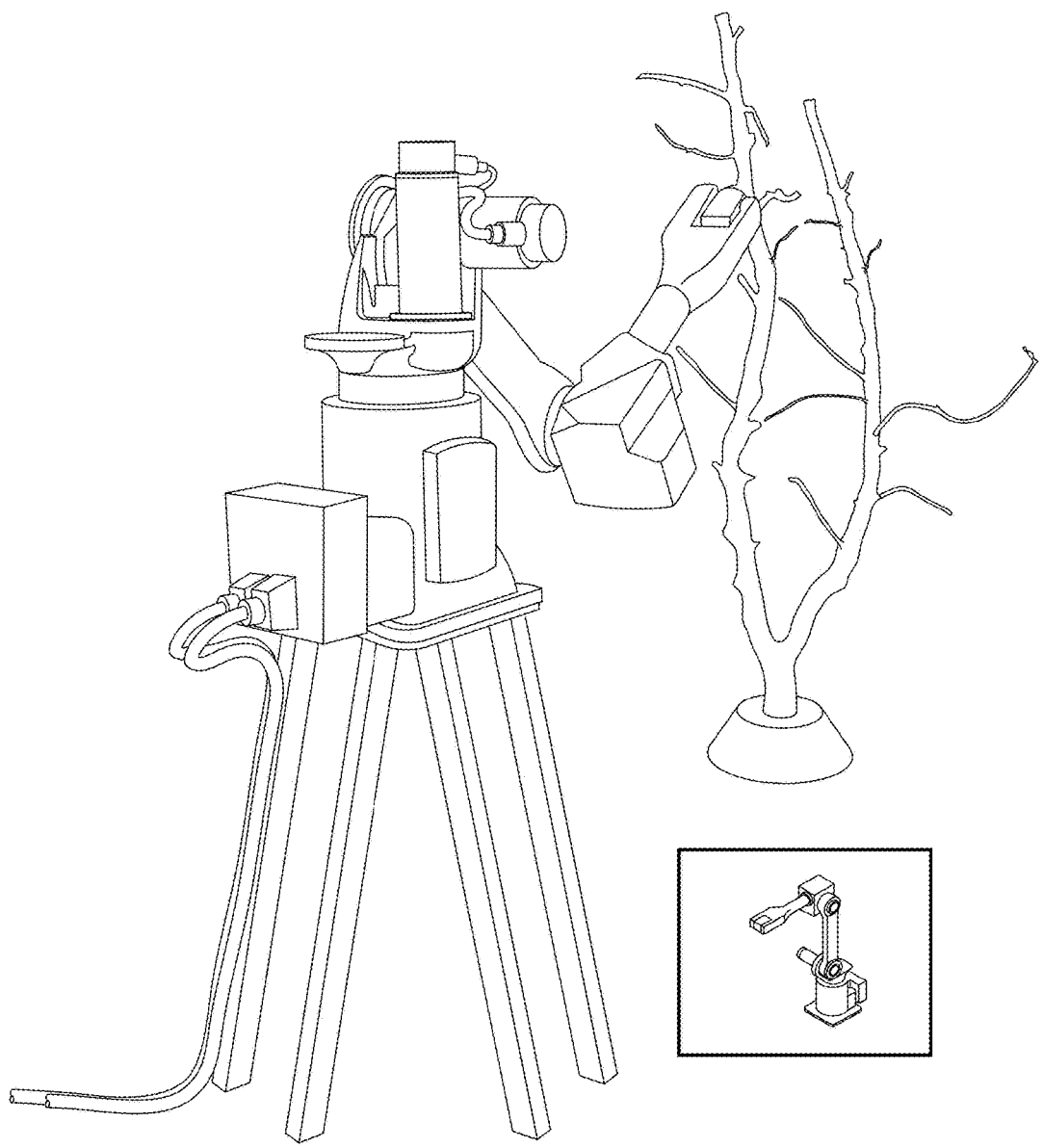
FIG. 4 is a pictorial representation of Picture and Solid-Works 3-D renderings of an M-16iL robotic arm.
Figure 5:
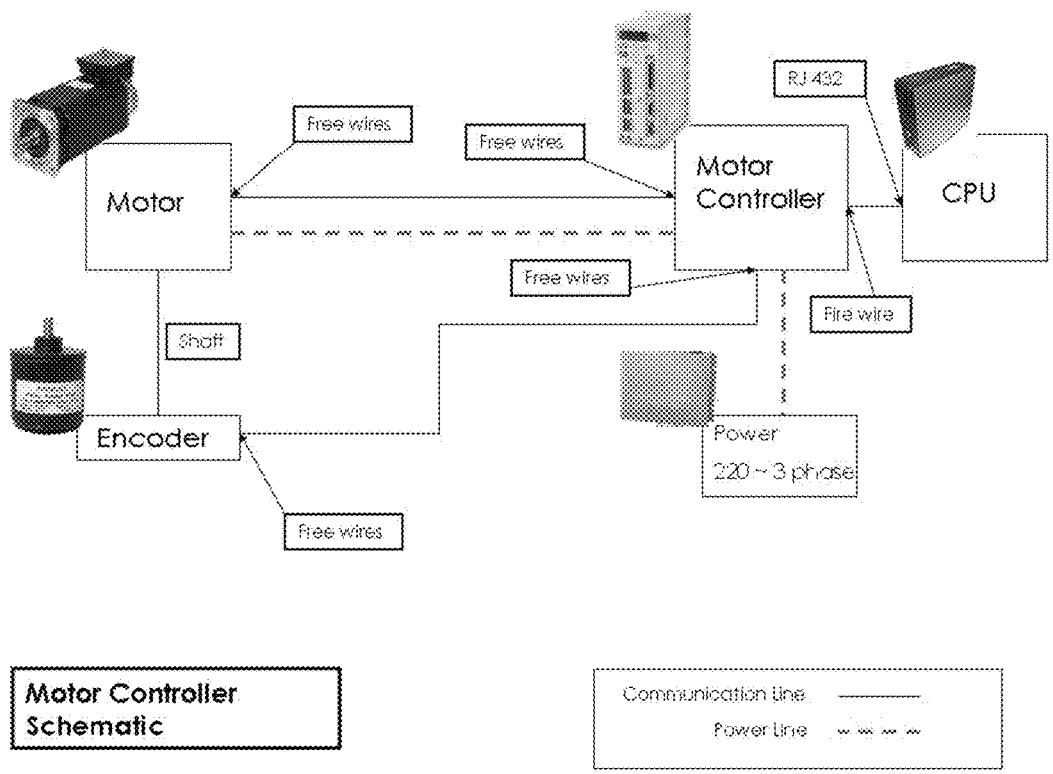
FIG. 5 is a pictorial representation of an M-16iL robotic arm electrical wiring.

The first method includes replacing the existing motor controllers with new programmable controllers; wherein the real time transversal data can be fed directly to the motors (FIG. 4). The second method includes a reverse engineering breakout method; which is where the pendant controller signal is replaced with customized transversal software. Note, the pendant controller is the physical input control for the robotic arm motor controllers. Nonetheless, both methods require replacement of the motors and motor controllers (encoders). These methods can be rather costly. Therefore, some aspects of the invention may be directed to design and construct a quarter-scale version of the M-16iL robotic arm. This will be discussed herein.

Figure 22:
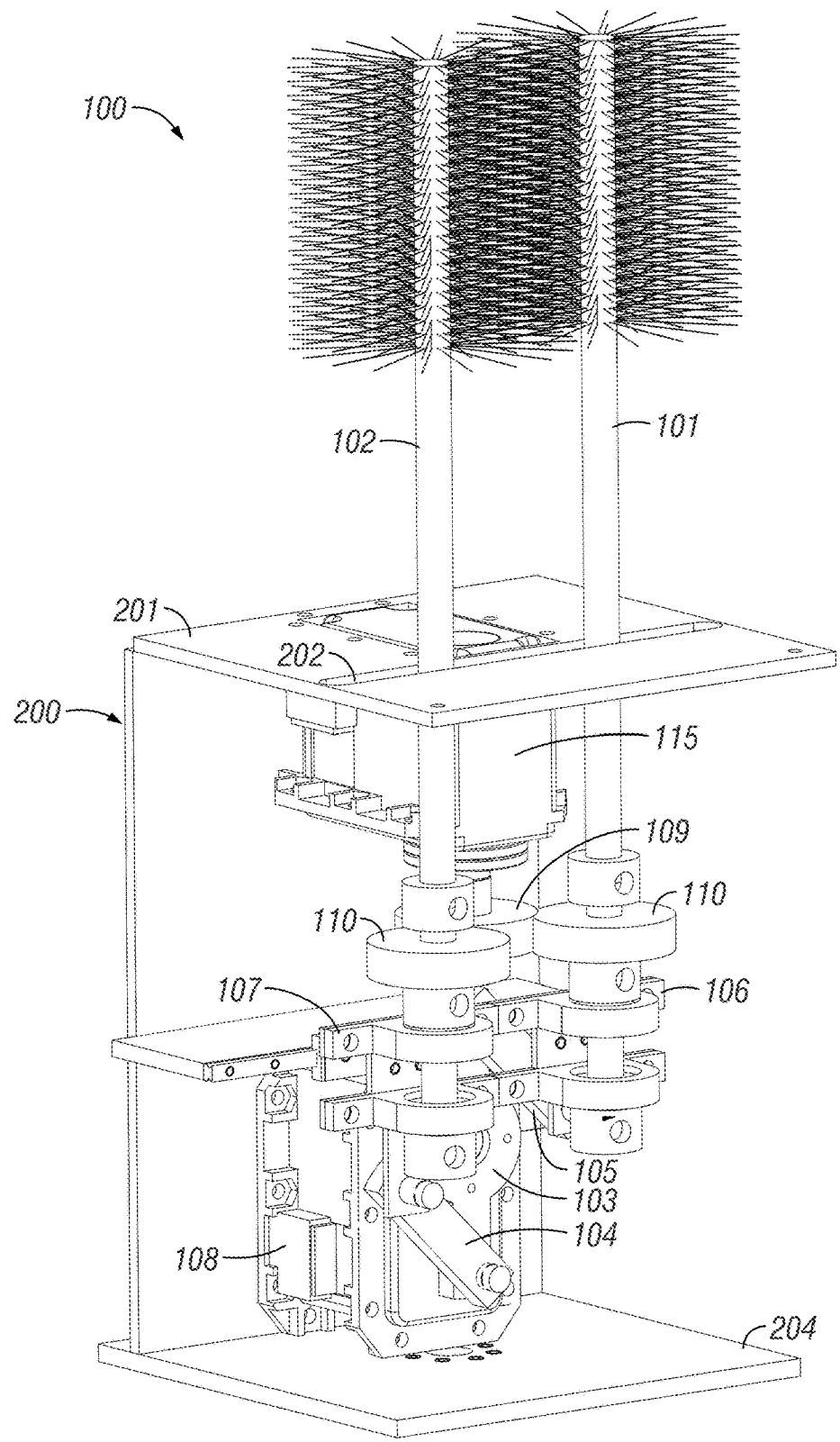
FIG. 22 is a pictorial representation of an end-effector prototype.

In order to create an effective thinning system, the design can be divided into four parts. One proposed system consisted of a vision targeting system, algorithm design, robotic arm and end-effector. Thus, a part of the invention includes a design of the quarter-scale robotic arm and blossom thinning end-effector. Hardware designs can be based upon peach orchard field requirements. The quarter-scale arm 10 (see, e.g. FIG. 43) can be designed to match the FANUC M-16i1 industrial robotic arm. The end-effector 100 (see, e.g., FIG. 22) can be designed to be applicable in a full-scale environment at the quarter-scale payload of the robotic arm 10.

Furthermore, the robotic arm can be considered to be animatronic or mechanical in nature. For example, when animatronic, the arm may be an autonomous system or used with an autonomous vehicle that positions the arm at or near a tree. The vision system and algorithm then determine how the arm is to be used to selectively remove shoots from a branch. As the arm includes a heuristic computing system, it will be able to track the branches cleaned such that it can send a signal the carrier vehicle to move to a next tree, where the system is repeated.

However, the robotic arm could also be mechanical in nature. As will be explained, an end effector 100 is included with the arm 10 to remove the shoots from a branch. The end effector can include spinning brush members to effectively remove the shoots. The robotic arm could be an exoskeleton-like device wherein a human user operates the arm to position the arm at or near a branch of a tree. The user could then operate the arm to position the end effector near a shoot to be removed. Activation of the arm, such as via a trigger, linkage, pulley, or the like, could cause the end effector to operate, such as by spinning one or more brush members, such that the shoot(s) is removed from the branch. The user would move from branch to branch and tree to tree to efficiently and easily remove the unwanted shoots.

Still further, the invention contemplates hybrid arms that may be partially mechanical and partially animatronical. For example, the thinning device could be at least partially manipulated by a user to either position or activate the arm and/or end effector to remove shoots from a branch, while doing some of the movements on its own.

As shown in FIG. 3, phase two of one example includes all experimental testing of the selective fruit thinning system. All experimental testing can be performed in a laboratory environment. According to one example, there were five separate case studies conducted on the thinning system. First the positioning of the robotic arm was evaluated with and without the end-effector. Next, the blossom force tests were performed using the end-effector, a high-speed camera, and Saturn peach blossoms artificially bloomed in a growth chamber. Finally, the spatial heuristics were observed with and without the aid of the vision system. Testing the thinning heuristics of the system with the vision targeting activated concluded the data acquisition portion of phase two (FIG. 3). Note the final test series included all parts of the automated thinning system.

All data collected in phase two was quantitative. This data was then analyzed using vector, force, and statistically analyses techniques.

Inverse Kinematic Algorithm

The inverse kinematic algorithm can then be programmed for the quarter-scale robotic arm 10. The quarter-scale design is an all revolute joint manipulator and is categorized as an articulated robotic arm with a spherical wrist. The algorithm calculates each of the robotic arm joint's variables (angular velocities and accelerations) based on positions (Cartesian coordinates x-y-z) within the robotic arm workspace. The joint variables can be expressed as a 3 by 1 position vector $O_{ef}=(O_6^0)$ with a 3 by 3 orientation matrix $R_{ef}=(R_6^0)$. Finding solutions to this problem can be difficult. However, solutions to a six revolute joint robotic arm with the last three joints configured as a spherical wrist can be found by a strategy called kinematics decoupling. The kinematic decoupling approach divides the equation into two smaller parts, an inverse kinematic position solution and an inverse orientation kinematic solution. The complete joint variables solutions are listed in equations 1 through 7. Note, d's, a's and c's are set parameters of the robotic arm. Equation seven is listed here as the position of the wrist center $O_c$ and is used to combine the two derivations. Note, $d_3$ is a link length parameter on the robotic arm, where subscripts refer to links unless noted as otherwise.

$$\theta_1 = \text{atan2}(y_c, x_c) \tag{1}$$

$$\theta_2 = \text{atan2}(s, r) - \text{atan2}(a_3 s_3, a_2 + d_4 c_3) \tag{2}$$
with $r = \sqrt{x_c^2 + y_c^2} - a_1, s = z_c - d_1$ $$\theta_3 = \text{atan2}(\pm\sqrt{1-D^2}, D) \tag{3}$$
with $D = \dfrac{\sqrt{r^2+s^2-a_2^2-d_4^2}}{2a_2 d_4}$ $$\theta_4 = \text{atan2}(r_{23}, r_{13}) \text{ or atan2}(-r_{32}, -r_{32}) \tag{4}$$

$$\theta_5 = \text{atan2}\left(\pm\sqrt{1-r_{33}^2}, r_{33}\right) \tag{5}$$

$$\theta_6 = \text{atan2}(r_{32}, -r_{31}) \text{ or atan2}(-r_{32}, r_{31}) \tag{6}$$

$$o_c = \begin{bmatrix} x_c \\ y_c \\ z_c \end{bmatrix} = o_{ef} - d_3 R \begin{bmatrix} 0 \\ 0 \\ 1 \end{bmatrix} \tag{7}$$

When calculating the inverse kinematic equations it is common for solutions not to be unique, meaning valid inputs may have four solutions, two solutions, or infinitely many solutions. The four solution case is the most frequent, where there are two possible $\theta_3$ with two $\theta_2$, two $\theta_4$, two $\theta_6$, and four $\theta_5$. The potential combinations are enumerated in Table 1.1.

TABLE 1.1

Potential combinations of possible joint variable table

| Joint Variable (Num. of candidates) | $\theta_1$ (1) | $\theta_2$ (2) | $\theta_3$ (2) | $\theta_4$ (2) | $\theta_5$ (4) | $\theta_6$ (2) |
|---|---|---|---|---|---|---|
| Solution 1 | I | I | I | I | I | I |
| 2 | I | I | I | I | II | I |
| 3 | I | II | II | II | III | II |
| 4 | I | II | II | II | IV | II |

The non-unique issue can be partially alleviated by setting the operating range of the joints' variables (axis servo motors). Limiting the range of motion for the servo motors eliminates possible candidates and allows for convergence to a single solution. See Table 1.2 for joint operating ranges.

TABLE 1.2

Joint servo motors operating limit table

| | Joint | | | | | |
|---|---|---|---|---|---|---|
| | 1 | 2 | 3 | 4 | 5 | 6 |
| Upper limit | 135° | 99° | 90° | 150° | 91° | 150° |
| Lower limit | −135° | −45° | −99° | −150° | −91° | −150° |

The geometric approach (inverse position kinematics) can be used to solve the first three joint variables, which can be characterized as an elbow of a robotic arm. By projecting the robotic arm onto a 2D plane, which are the $x_o$-$y_o$ plane and the $x_o$-$z_o$ plane in a three dimensional (3D) space, the problem becomes a simple trigonometry exercise, see FIG. 8.

Figure 6:
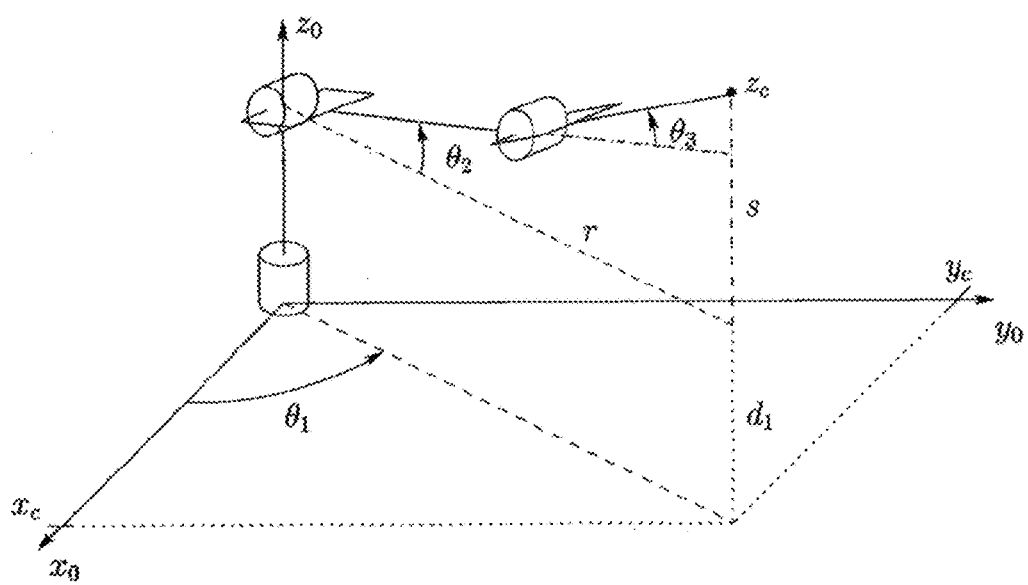
FIG. 6 is a pictorial representation of a robotic arm projected onto the 0 frame.

In FIG. 6, the $x_o$ axis and the projection of the robotic arm on the $x_o$-$y_o$ plane has an angle $\theta_1$. See Equation (2) for $\theta_1$ equation. Using the equation (8), $\theta_1$ becomes a unique solution for joint 1.

$$\theta_1 = a\tan 2(y_c, x_c) \tag{8}$$

Figure 7:
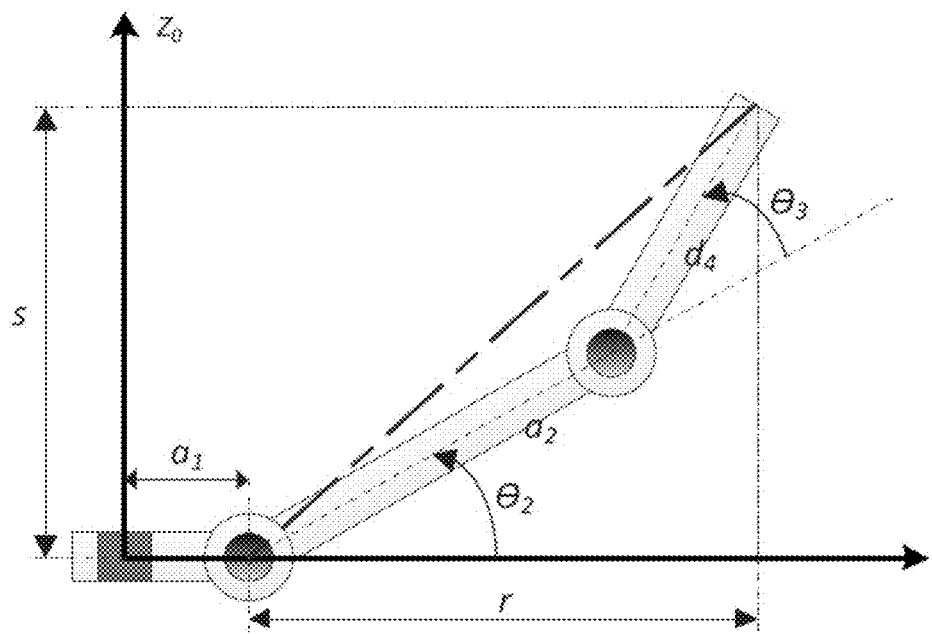
FIG. 7 is a pictorial representation of a robotic arm projected on a 2D plane.

Looking back at the robotic arm projected onto the 2D plane simplifies the problem (FIG. 7). The two joints can be solved by applying the law of cosine, see equations (9) through (12).

$$r = \sqrt{x_c^2 + y_c^2} - a_1 \text{ and } z_c - d_1, \tag{9}$$

$$\cos(\pi - \theta_3) = \frac{a_2^2 + d_4^2 - (r^2 + s^2)}{2a_2 d_4} = D$$

$$\cos\theta_3 = \frac{(r^2 - s^2) - a_2^2 - d_4^2}{2a_2 d_4} = D \tag{10}$$

$$\theta_3 = \mathrm{atan2}(\pm\sqrt{1 - D^2}, D) \tag{11}$$

$$\theta_2 = \mathrm{atan2}(s, r) - \mathrm{atan2}(a_3 s_3, a_2 + d_4 c_3) \tag{12}$$

Angles $\theta_1$, $\theta_2$, and $\theta_3$ of the robotic arm now nave solutions and inverse orientation kinematics can be used to solve for the remaining joint variables. The first three joint variables can be represented in the form of a rotation matrix $R_3^0$ and transfer the reference frame from $o_0 x_0 y_0 z_0$ to $o_3 x_3 y_3 z_3$ which is the frame of the wrist center. Since R (input) and $R_3^0$ are both known, the $R_6^0$ rotational matrix can be solved, see Equations (13) and (14). The $R_6^3$ rotational matrix, Equation (15), is identical to a specific form of rotation called Euler angle transformation.

$$R = R_0^6 = R_3^0 R_6^3 \tag{13}$$

$$R_6^3 = (R_3^0)^{-1} R = (R_3^0)^T R = \text{known values} \tag{14}$$

Besides, $R_3^6$ can be represented by $\theta_4$, $\theta_5$, and $\theta_6$ as $$R_6^3 = \begin{bmatrix} c_4 c_5 c_6 - s_4 s_6 & -c_4 c_5 s_6 - s_4 c_6 & c_4 s_5 \\ s_4 c_5 c_6 + c_4 s_6 & -s_4 c_5 s_6 + c_4 c_6 & s_4 s_5 \\ -s_5 c_6 & s_5 s_6 & c_5 \end{bmatrix} = \text{expression in } \theta_4, \tag{15}$$

$\theta_5$, and $\theta_6$ $$R_6^3 = \begin{bmatrix} -c_4 c_6 - s_4 s_6 & -c_4 s_6 - s_4 c_6 & 0 \\ -s_4 c_6 + c_4 s_6 & -s_4 s_6 + c_4 c_6 & 0 \\ 0 & 0 & -1 \end{bmatrix} = \begin{bmatrix} -c_{4-6} & -s_{4-6} & 0 \\ -s_{4-6} & c_{4-6} & 0 \\ 0 & 0 & -1 \end{bmatrix} \tag{16}$$

And the solution is $$\theta_4 - \theta_6 = a\tan 2(-r_{12}, -r_{11})$$

The default value of $\theta_4$ is 180°.

Although the sum of the rotational matrix $R_6^3$ can be determined, there can be infinitely many combinations of $\theta_4$ and $\theta_6$. To address this issue, $\theta_4$ is set to 180° in the kinematic control software, (Equation (16)). The kinematic control software of the robotic arm was written in MATLAB® version 7.11 (R2010b) using the Symbolic Math Toolbox™ version 5.5 (R2010b).

The vision system uses a correlation-based stereo vision approach to 3D blossom mapping for automated thinning of peach blossoms on perpendicular "V" architecture trees (FIG. 2). The vision algorithm was developed for utilizing trinocular stereo with low complexity that dynamically selects camera pairs and triplets for triangulation. The five part step by step process for blossom mapping is listed below.

[1] Calibrate the cameras.
[2] Capture synchronized nighttime views of peach trees using flash illumination.
[3] Perform window correlation in depth space.
[4] Apply error correction based upon a selection of certainty measures or validation metrics.
[5] Deliver the 3D blossom point cloud to the heuristic algorithm.

Vision System Algorithm

Traditional stereo vision literature focuses on epipolar geometry and reducing the reconstruction to mere disparity estimation between different views. This global optimization approaches become computationally complex with increasing resolution and the functional assumption does not apply to the scene in this work, where all the blossoms have the same color, even across depth discontinuities. An alternative and more computationally efficient technique to global surface optimization is to use a strong rejection of false matches using an uncertainty measure.

Therefore, windows correlation was selected for this application because it is highly suitable for real-time parallel processing, and avoids warping problems from extrinsic rectification. Consequently, the algorithm uses the depth discourse rather than the disparity discourse. This means for each point in a reference frame, the depth is estimated instead of the disparity. Rather than performing projection of each depth layer, a line is given by minimum and maximum depth. The line is bent if lens distortion is present. Modern machine vision cameras are capable of delivering lens distortion compensated images.

Figure 8:
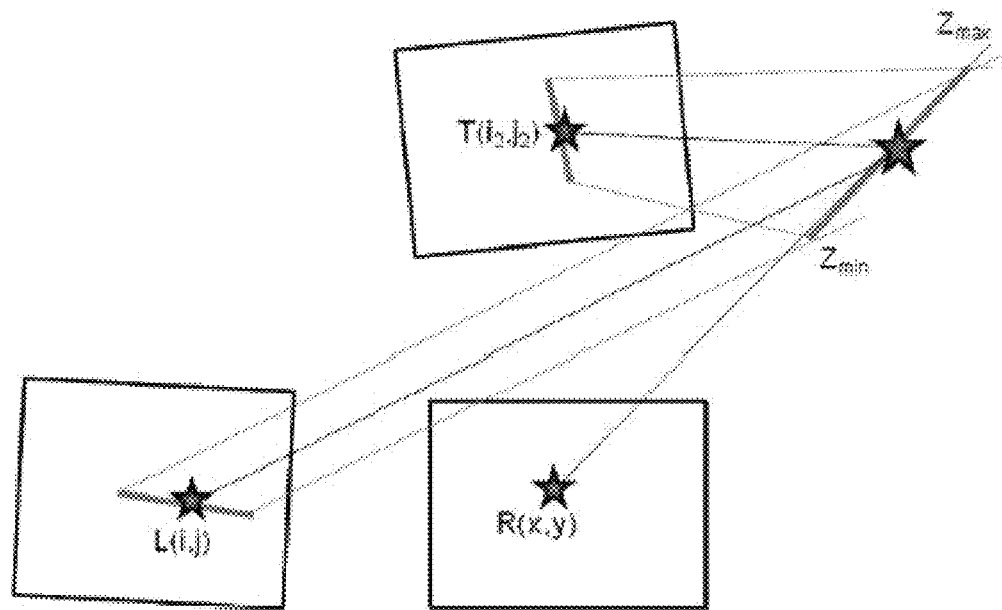
FIG. 8 is a pictorial representation of blossom pixels in R, a predefined range on its depth line is projected into frames L and T.

A fixed window size of 7000 pixels for each window trial may be selected for this work. Blossoms are segmented by thresholding the red color channel in each of the three views. Results have shown that this is an efficient means of identifying the blossoms on the proximal limb of the perpendicular "V" architecture trees. The objective is then reduced to finding the correspondences between blossom pixels from one image to another. Where R, L and T are the intensity images of the reference frame right, left and top cameras, respectively (FIG. 8).

Binocular camera pairs have been defined as R-L and R-T, while the trinocular triangulation have been defined as R-L-T. The core of this method is the sum of squared differences (SSD) and Symmetric Multiple Windows (SMW), (Equation (17)).

$$D_{I_1 I_2}(x, y, k) = \underset{(i,j) \in S}{\operatorname{argmin}} \sum_{(a,b) \in W_k} (I_1(x+u, y+b) - I_2(i+u, j+b))^2 \qquad (17)$$

The essence of this equation is that a correspondence within the search space, S, is tested using a number of windows, Wk, of equal size, but centered differently around (x, y) and (i, j). Five windows can be used: centered and off-centered in the corners such that matching at depth discontinuities is improved. Therefore, the best match is found at the minimum dissimilarity measured by SSD in the correlation window. $D_{1112}$ forms an image pair, e.g., DTR is the map between the Top and Right images. The equation in FIG. 8 selects the correspondence (i, j) in alternative frames for the Kth window. Sometimes it is beneficial to triangulate through all three frames to get the 3D point, other times it is better to treat the three cameras as two independent camera pairs. Consequently, the algorithm has the ability to adapt to using either binocular pairs or the trinocular set for triangulation.

The uncertainty equation, (Equation (19)) is defined as the variation in correspondences found by the multiple windows tested and used to find the one with minimum SSD in Equation (17). For the sake of simplicity, the (i, j) correspondences in $D_{1112}(x, y, z)$ are referred to as ik and jk found in Equations (18) and (19).

$$\hat{i} = \frac{1}{5} \sum_k i_k \quad \hat{j} = \frac{1}{5} \sum_k j_k \qquad (18)$$

$$c(x, y) = \frac{1}{5} \sum_k \sqrt{(i_k - \hat{i})^2 + (j_k - \hat{j})^2} \qquad (19)$$

Where c is the uncertainty at a given pixel (x, y), based on the corresponding (ik, jk) for each of the five windows and their means. Correspondence maps and uncertainty maps are generated for R-L and R-T pairs in all images. Once a blossom window match is found, it is crosschecked for right-left and left-right for consistency. All matches with a c above a prescribed threshold (certainty threshold) are invalidated. The remaining validated corresponding points are triangulated into 3D points.

Peach (*Prunus persica* (L.) Batsch) Crop Load Management Practice Background for Thinning Heuristics Horticulturalist goals for blossom thinning management are to reduce the competition between developing fruits and to reduce hand thinning labor. Peach is a high value crop, so the risk of over-thinning should be minimized. Additional factors, such as low bud health, lack of pollination, and adverse weather can also reduce fruit set. In common practice there may be 10 or more flowers present for every fruit that is desired, the percentage of flowers that ultimately set fruit is usually less than 100%. For these reasons, crop load management practices typically leave a smaller surplus, while drastically reducing the number of flowers.

While there may be some flowers present on older wood, the greatest numbers of viable peach flowers occur on the previous season's shoots. So the primary target for selective thinning is to address the flower density on one-year-old shoots. Another goal of managing crop load through thinning is to leave space between the fruits so that fruits are not touching one another. This reduces the risk of insect damage, which often occurs where two fruits touch one another. Spacing fruits out may prevent misshapen fruit, and enhances red coloration of mature fruits through uniform exposure to sunlight. If the final diameter of the remaining fruits at harvest is to be 8 cm (3.14 in), then it follows that this should be the minimum linear distance between fruits on a peach shoot.

The initial step in cropload management in modern peach orchard systems is to reduce cropping potential by thinning out the number of fruiting shoots and eliminating those shoots that are too short or too long. The length of fruiting shoots present at blossom thinning should fall between 20 cm to 60 cm (7.87 in to 23.6 in). The most recent approach used in green fruit hand thinning is to identify three classes of shoot fruit carrying capacity, based on length. Shoots 20 cm-30 cm (7.87 in-11.8 in). Length can support two peach fruits, those 31 cm-46 cm (11.9 in-18.1 in) in length can support three peach fruits, and those 47-60 cm (18.2 in-23.6 in) in length, four peach fruits. This crop load management thinning practice can be surmised as follows:

1. Shoots 20 cm-30 cm (7.87 in-11.8 in)

All flowers in the basal 5 cm (1.96 in) of shoot length should be removed, as fruits in this section are often crowded by the proximity of the supporting structural limb (scaffold). Two flowers would then be left in the next 6 cm-11 cm (1.97 in-4.33 in), and then all flowers removed for a distance of 8 cm (3.14 in), with two more flowers left between 19 cm-24 cm (7.48 in-9.44 in). Any more distal flowers would be removed from 25 cm-30 cm (9.5 in-11.8 in) shoots, completing this smallest shoot class.

2. Shoots 31 cm-46 cm (11.9 in-18.1 in)

If the shoot is 31-46 cm in length, then the thinning would begin the same as the shorter class. Two flowers would then be left between 32 cm to 37 cm (12.6 in to 14.5 in). Then all flowers more distal than 38 cm (14.96 in) removed.

3. Shoots 47-60 cm

If the shoot is >46 cm (18.1 in) in length, the thinning would begin the same as the middle class. Two flowers would then be left between 45 cm and 50 cm (17.7 in-19.7 in). Then all flowers more distal than 51 cm (19.8 in) removed.

Heuristic Algorithm

The hand thinning process for peaches typically involves removing the blossoms in a spatial pattern based on the blossom density of each select cultivar. This spatial pattern is based on the grower's experience and peach (*Prunus persica* (L.) Batsch) crop load management practices. The Saturn variety cultivar was selected for one study. This cultivar was used as the standard species for programming of the heuristic algorithm. Note, for other peach cultivars the algorithm can be adjusted to meet the blossom density thinning needs of each unique blossom cluster patterns.

Figure 9:
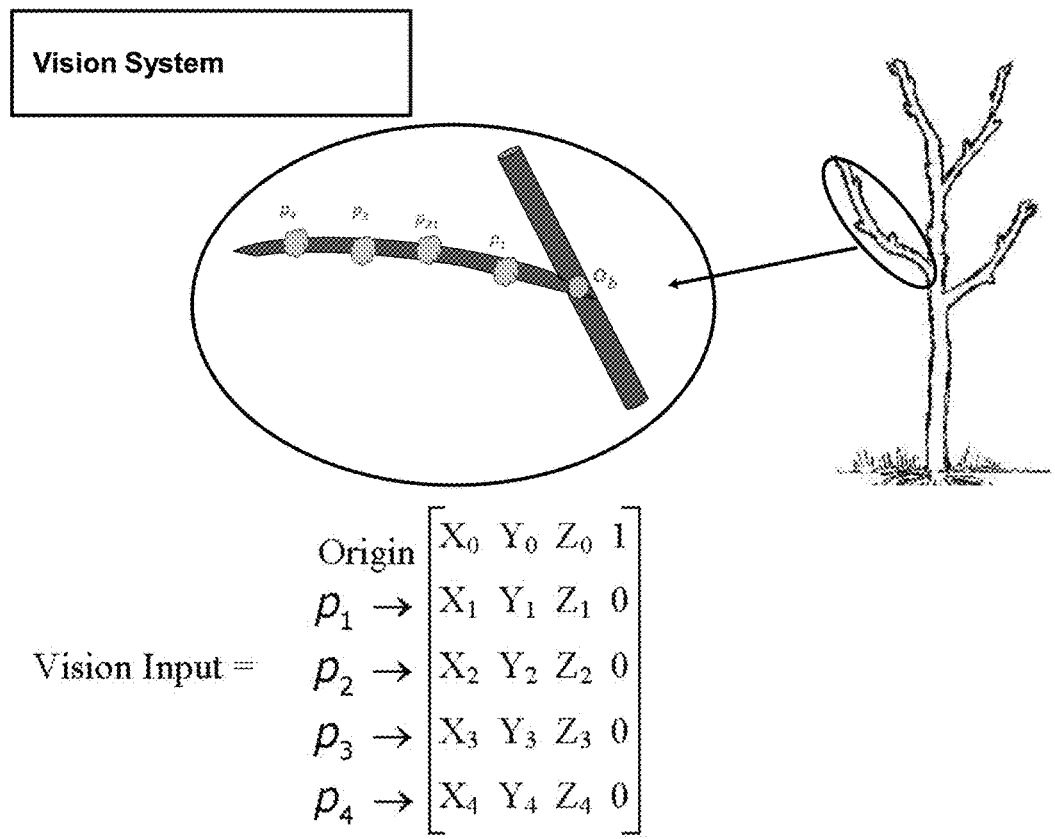
FIG. 9 is a pictorial representation of a Boolean operator subroutine schematic.

In order to correctly thin each branch, the blossom position matrix input from the vision system is filtered through a heuristic identity subroutine that added a Boolean operator to each blossom 3D position. This true false binary addition to each coordinate set, confirmed the beginning of each branch (FIG. 9).

Figure 10:
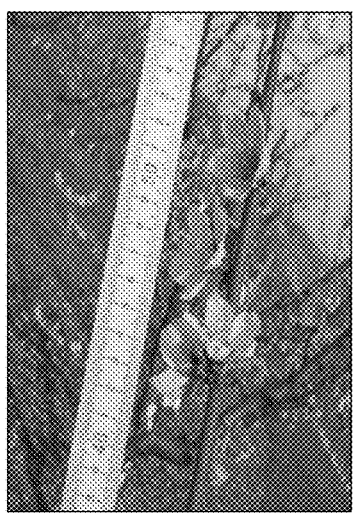
FIG. 10 is a pictorial representation of a heuristic thinning algorithm schematic.
Figure 10:
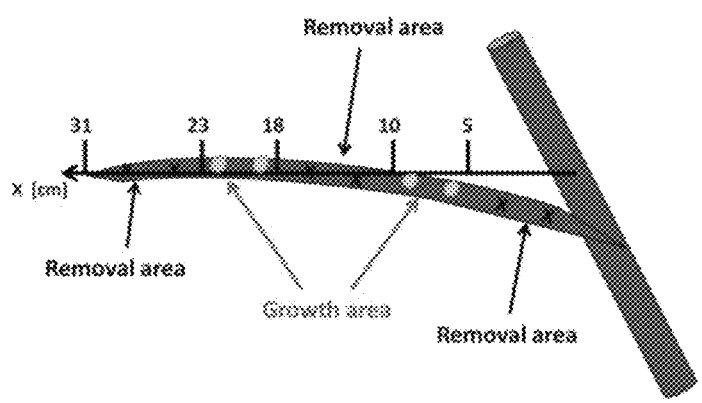

After the origin of each branch has been established the spatial thinning algorithm creates removal zones based on the length of the branch. The length is calculated by vector addition from the origin to the last point on the branch (last false Boolean response or 0). Once the length of the branch is known, the removal zone pattern selects blossoms from the origin to the first 5 cm (1.96 in) along the averaged vector for removal. The algorithm then skips the next vector averaged 5 cm (1.96 in) and targets the next 8 cm (3.15 in) for complete removal. From this point on the algorithm follows a 5 cm (1.96 in) skip, to 8 cm (3.15 in) target pattern; targeting all blossoms within the 8 cm (3.15 in) window for removal until the end of the branch (FIG. 10).

After the removal zones have been established, the target blossom coordinates are placed in a target array. The algorithm then targets blossoms in the previously skipped 5 cm (1.96 in) regions, called the growth zone. The algorithm selects all blossom in this 5 cm (1.96 in) region except the furthest blossom pairs from the center of the vector averaged 5 cm (1.96 in) regions (FIG. 10). If the growth zones do not contain two blossom pairs, the algorithm will take the closest blossom pairs to either side in the removal zone out of the target array. The selected blossoms from the growth zone are then added to the target array. Once the target array has been filled with the branch's removal coordinates, a kinematic command series of subroutines run the robotic arm and end-effector to the positions for removal.

Blossom Removal (Force Study)

The typical hand removal method used in blossom thinning is the club method. The club method has many variations but the technique behind the blossom removal is the same. A rubber hose attached to a wooden handle or plastic bat is used to knock off unwanted blossoms. A skilled worker will concentrate their swings (force) perpendicular to the growth pattern of the blossom. This method has been mechanically duplicated with ropes and plastic chords, as seen with the Darwin String Thinner. In general the blossom branch configuration can be viewed as a single fixed support and/or cantilever beam system.

A cantilever beam is one in which one end is built into a wall or in this case a branch, where the built-in end cannot move transversely or rotate. Reactions, such as the internal shear or failure mode for the beam can be obtained from a free-body diagram and applying the equations of equilibrium. The force required to detach a blossom and/or create a shearing failure mode can be calculated using Newton's Second Law of motion, F=ma. Note, Biological systems are continually changing during the bloom or growth season making the ability to find a constant difficult. Young's Modulus and other pertinent material properties of peach blossoms for varying degrees of growth has not been cataloged to date. Thus, an empirical investigation was chosen over a computational study.

Figure 11:
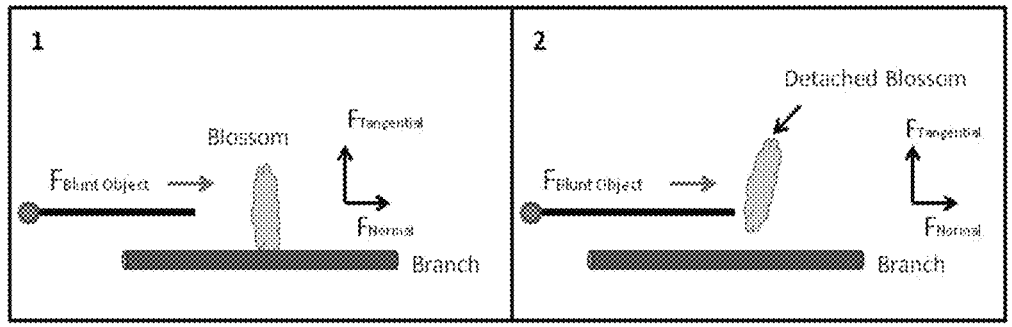
FIG. 11 is a pictorial representation of an applied point load to 90 degree blossom and resulting force balance equation.

Two separate case studies were conducted with two different applied loads. The first approach investigated was an applied load at a single point. This approach would simulate a force applied to the blossom from a single strike and/or perpendicular pushing motion. Using the coordinate frame from the center of the point force, gives an applied load in the normal direction. The normal force required to detach the blossom can be calculated using the equation of motion. Summing the forces applied to the length of the blossom and calculating the time in conjunction with the applied linear velocity results the force used for detachment as shown in FIG. 11. Note, a constant mass is assumed for this calculation.

Figure 12:
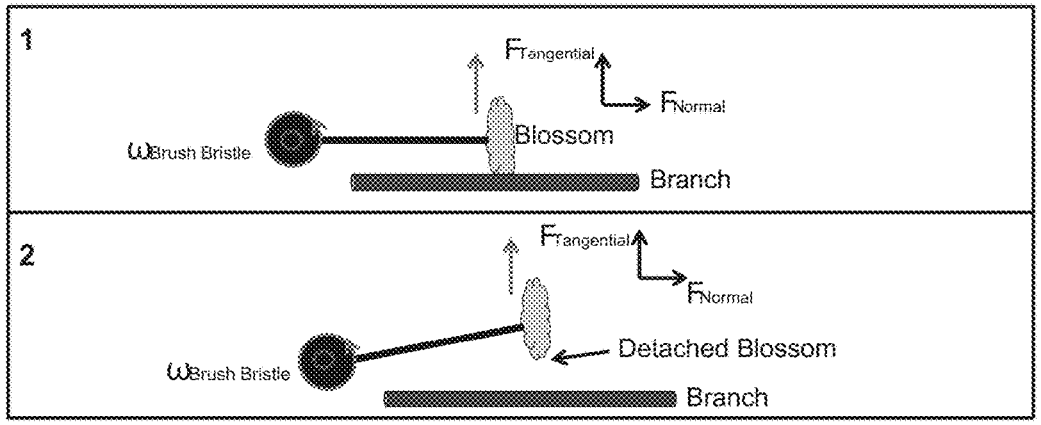
FIG. 12 is a pictorial representation of an applied load to 90 degree blossom and resulting force balance.
Figure 13:
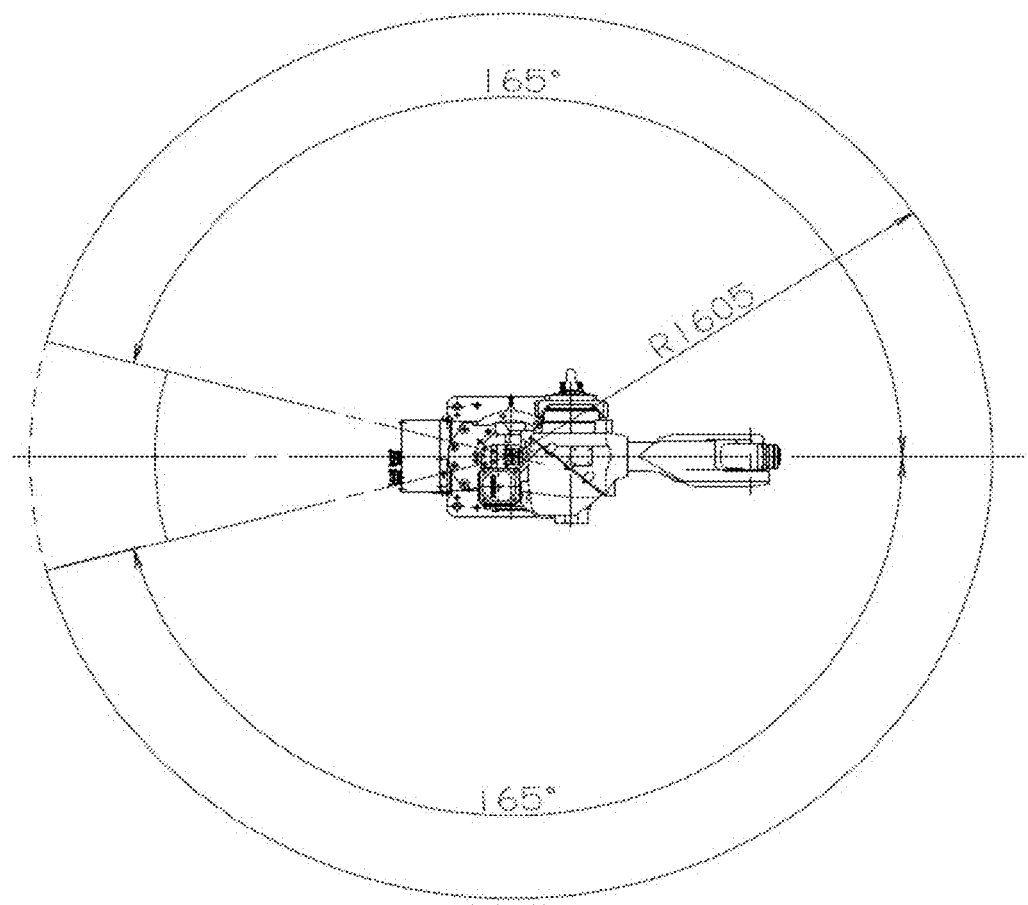
FIG. 13 is a pictorial representation of an M-16iL robotic arm (FANUC, 2000)
Figure 14:
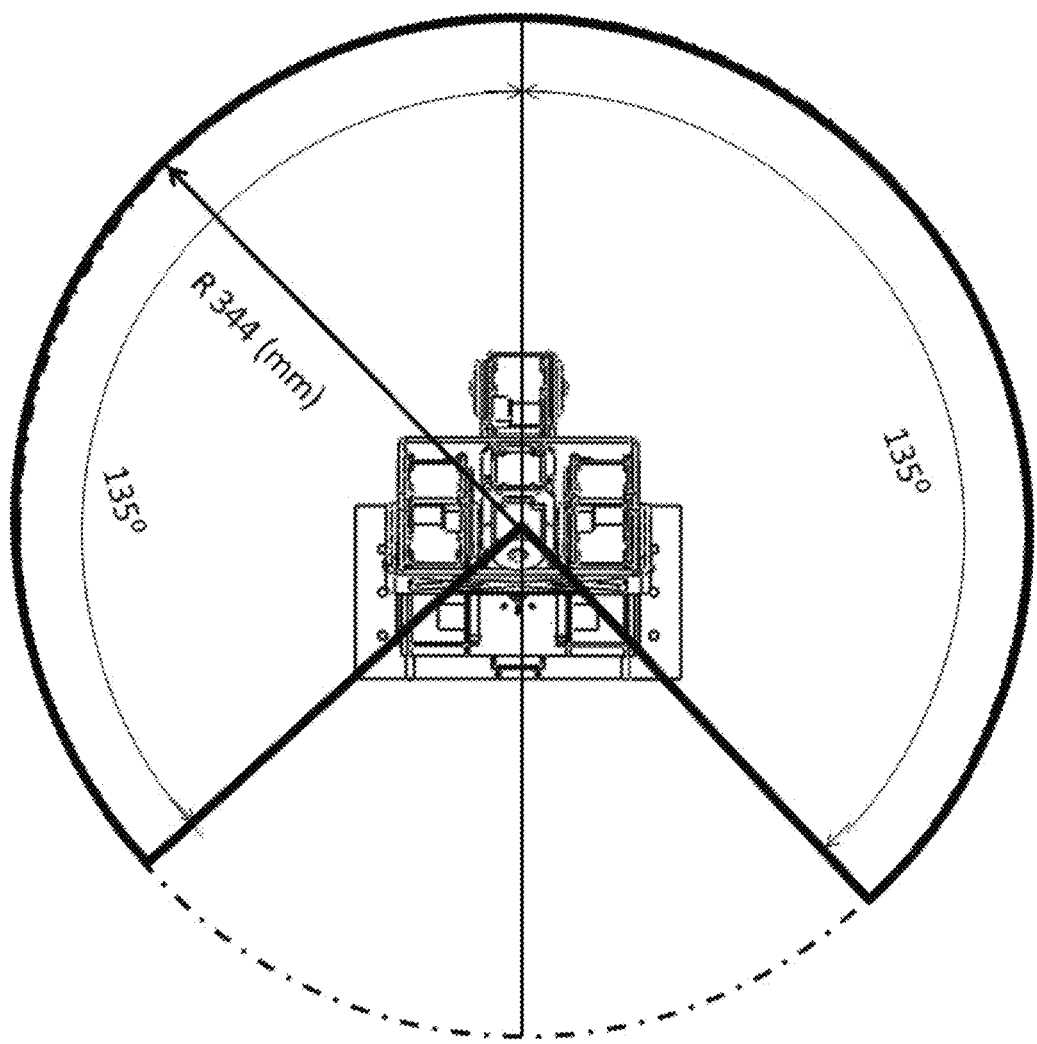
FIG. 14 is a pictorial representation of a quarter-scale robotic arm workspace schematic top view.

The second approach examined was a tangential force applied to the length of the blossom. This second technique allowed for the mimicking of an angular velocity or sweeping motion over the length of the blossom as shown in FIG. 12. The tangential force required to detach the blossom with an applied angular velocity can be calculated using the equation of motion. Summing the forces applied to the length of the blossom and calculating the time in conjunction with the applied rotational speed, revolutions per minute (RPM), results the force used for detachment. Using the coordinate frame from the center of rotation gives an applied force in the tangential direction. Note, uniform circular motion is assumed for this calculation.

One branch blossom interface system is a bud protruding 90° perpendicular to the branch. However, a biological system always presents challenges. In this case the buds or blossom formations grow randomly with varying angles from the branch. In order to overcome this dilemma a statistical analysis will be performed averaging a sample size equal to or above the normal distribution.

Experimental Design

An experimental setup for the various kinematic, heuristic, and applied force tests conducted can be used according to various aspects of the invention.

All experimental testing for the exemplary example described herein was performed at an Automation and Mechatronics Laboratory (AML). The AML facility is a 6.09 m by 4.87 m (20 ft by 16 ft) room which houses three separate test stations. The test stations can be setup to run various small-scaled experiments. Each test station has a primary computer for mechatronics control, algorithm programming, data acquisition tasks and/or advanced diagnostics. Separate cable and power access ports are also available at each test station for secondary equipment.

Test station one is 3.65 m by 0.76 m (12 ft by 2.5 ft) sectional laboratory countertop. The CPU, cameras, robotic arm, and test plate were aligned from left to right. The position of the components changed based on testing phase requirements.

Quarter-Scale Robotic Arm Hardware

A robotic arm prototype was designed and built for the study described in the present example. The robotic arm design was modeled after the industrial grade FANUC M-16iL robotic arm. The FANUC M-16iL is a double-jointed robotic arm, with six axes of rotation. The robotic arm offers a longitudinal 330o rotation, 1605 mm (5.26 ft) workspace, with an 1813 mm (5.94 ft) extended reach (FIGS. 4.2 and 4.3). The six axes of rotations or joints are revolute and controlled by servomotor encoder combinations; see Table 4.1 for servomotors details. The M-16iL can handle payloads up to 10 kg (22 lbs).

TABLE 4.1

M-16iL robotic arm motor specifications table

Specs

| | Axis 1 | | Axis 2 | | Axis 3 | | Axis 4 | | Axis 5 | | Axis 6 | |
|---|---|---|---|---|---|---|---|---|---|---|---|---|
| Model | AM9/3000 | Model | AM9/3000 | Model | A2/3000 | Model | A1/3000 | Model | B0.5/3000 | Model | B0.5/3000 |
| Output (Watts) | 18000 | Output (Watts) | 18000 | Output (Watts) | 5000 | Output (Watts) | 3000 | Output (Watts) | 200 | Output (Watts) | 200 |
| Volt (V) | 161 | Volt (V) | 161 | Volt (V) | 129 | Volt (V) | 90 | Volt (V) | 49 | Volt (V) | 49 |
| Amp (A) | 6.8 | Amp (A) | 6.8 | Amp (A) | 2.4 | Amp (A) | 2.3 | Amp (A) | 2.8 | Amp (A) | 2.8 |
| Freq (Hz) | 200 | Freq (Hz) | 200 | Freq (Hz) | 200 | Freq (Hz) | 200 | Freq (Hz) | 200 | Freq (Hz) | 200 |

TABLE 4.1-continued

M-16iL robotic arm motor specifications table

Specs

| Speed (1/Min) | 3000 | Speed (1/Min) | 3000 | Speed (1/Min) | 3000 | Speed (1/Min) | 3000 | Speed (1/Min) | 3000 | Speed (1/Min) | 3000 |
|---|---|---|---|---|---|---|---|---|---|---|---|
| 3 Phase | | 3 Phase | | 3 Phase | | 3 Phase | | 3 Phase | | 3 Phase | |
| Stall Torque (Nm) | 9 | Stall Torque (Nm) | 9 | Stall Torque (Nm) | 2 | Stall Torque (Nm) | 1 | Stall Torque (Nm) | 0.65 | Stall Torque (Nm) | 0.65 |
| @ AMP | 10 | @ AMP | 10 | @ AMP | 3 | @ AMP | 2.3 | @ AMP | 2.8 | @ AMP | 2.8 |
| Stall Torque (ft * lb) | 6.64 | Stall Torque (ft * lb) | 6.64 | Stall Torque (ft * lb) | 1.48 | Stall Torque (ft * lb) | 0.74 | Stall Torque (ft * lb) | 0.48 | Stall Torque (ft * lb) | 0.48 |

Figure 15:
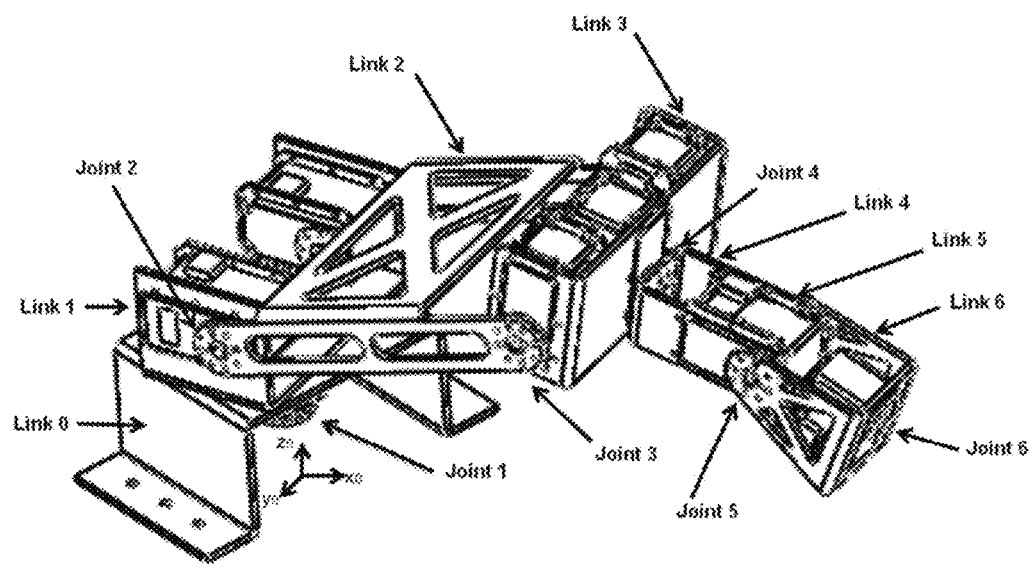
FIG. 15 is a pictorial representation of a joint servomotor schematic.

The robotic arm prototype was constructed out of an aluminum alloy 6011 (AA6011). The quarter-scale model has a longitudinal 270° rotation, 344.4 mm (1.13 ft) workspace, with and a maximum payload of 2.5 kg (5.5 lbs). The longitudinal degrees of rotation and workspace are approximately 18% and 14% percent lower, respectively, than the calculated quarter-scale values. The rotation of the quarter-scale model was reduced for simplification of the kinematic programming. The workspace was scaled down due to the torque limitations of the robotic servomotors. The revolute joints on the prototype were actuated by ROBOTIS servomotors (FIG. 15). The ROBOTIS motors were connected in a daisy chain formation using a RS-485 network bus controller. See Table 4.2 for ROBOTIS servomotors details

TABLE 4.2

Quarter-scale robotic arm motor specifications table (ROBOTIS, 2007)

| Model | RX-28 | RX-64 | EX-106+ |
|---|---|---|---|
| Stall Torque @ Max Voltage | 3.7N · m (37.7 kg-cm) | 5.3N · m (54 kg-cm) | 10.9N· m (111 kg-cm) |
| Speed (RPM) | 85 | 64 | 91 |
| Nominal Operating Voltage | 12-18.5 V | 12-18.5 V | 12-18.5 V |
| Stall Current Draw | 1.9A | 2.6A | 7A |
| Dimensions | 35.6 × 50.6 × 35.5 mm | 40.2 × 61.1 × 41 mm | 40.2 × 65.1 × 46 mm |
| Weight | 72 g | 125 g | 154 g |
| Resolution | 0.29° | 0.29° | 0.29° |
| Operating Angle | 300 | 300 | 251 |
| Gear Reduction | 193:1 | 200:1 | 184:1 |
| Geartrain Material | Hardened Steel | Hardened Steel | Hardened Steel |
| Onboard CPU | ATMega8 (ATMEGA8-16AU @ 16 MHZ, 8 Bit) | ATMega8 (ATMEGA8-16AU @ 16 MHZ, 8 Bit) | ATMega8 (ATMEGA8-16AU @ 16 MHZ, 8 Bit) |
| Position Sensor | Potentiometer | Potentiometer | Magnetic Encoder |
| Com Protocol | TTL | RS-485 | RS-485 |
| Com Speed | 1 mbps | 1 mbps | 1 mbps |
| Compliance/PID | Compliance | Compliance | Compliance |

As per the M-16iL design, the quarter-scale prototype can be a 6-DOF all-revolute-joint robotic arm, which is categorized as an articulated manipulator with a spherical wrist. The Denavit-Hartenberg (DH) convention is applied for describing reference frames for joints. Figure Table 4.3 provides all the DH parameters of the prototype. The zero position or default position for the robotic arm is a vertically fully extended gesture.

TABLE 4.3

Robotic arm DH parameters table
Denavit-Hartenberg Table

| i | $a_{i-1}$ | $\alpha_{i-1}$ | $d_i$ | $\theta_i$ |
|---|---|---|---|---|
| 1 | $a_1$ | 90 | $d_1$ | $\theta_1$ |
| 2 | $a_2$ | 0 | 0 | $\theta_2$ |
| 3 | $a_3$ | -90 | 0 | $\theta_3$ |
| 4 | 0 | 90 | 0 | $\theta_4$ |
| 5 | 0 | -90 | 0 | $\theta_5$ |
| 6 | 0 | 0 | $d_6$ | $\theta_6$ |

*The D-H Table variable parameter values can be found below.

| Variable Parameters | | | | |
|---|---|---|---|---|
| $a_1$ | 1.35 | [cm] | $d_1$ | 11.40 [cm] |
| $a_2$ | 17.75 | [cm] | $d_6$ | 6.40 [cm] |
| $a_3$ | 10.25 | [cm] | | |

Variables a and d in Table 4.3 represent the lengths of each respective link. While a and θ represent the angles of the common normal and new to old link respectively. Each row of Table 4.3 represents a system of linear equations, or the homogeneous transformation Ai, which can be broken into four basic transformations (Equation (20)). Note different references may have their own methods for carrying out the four transformations. Thus, the final product can look different, although they carry the same information.

$$A_i(\theta_i) = Rot_{z,\theta_i} Trans_{z_i d_i} Trans_{x_i a_i} Rot_{x_i \alpha_i} \quad (20)$$

$$= \begin{bmatrix} c_{\theta_i} & -s_{\theta_i} & 0 & 0 \\ s_{\theta_i} & c_{\theta_i} & 0 & 0 \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ 0 & 0 & 1 & d_i \\ 0 & 0 & 0 & 1 \end{bmatrix} \begin{bmatrix} 1 & 0 & 0 & a_i \\ 0 & 1 & 0 & 0 \\ 0 & 0 & 1 & 0 \\ 0 & 0 & 0 & 1 \end{bmatrix}$$

$$\begin{bmatrix} 1 & 0 & 0 & 0 \\ 0 & c_{\alpha_i} & -s_{\alpha_i} & 0 \\ 0 & s_{\alpha_i} & c_{\alpha_i} & 0 \\ 0 & 0 & 0 & 1 \end{bmatrix}$$

$$= \begin{bmatrix} c_{\theta_i} & -s_{\theta_i} c_{\alpha_i} & s_{\theta_i} s_{\alpha_i} & a_i c_{\theta_i} \\ s_{\theta_i} & c_{\theta_i} c_{\alpha_i} & -c_{\theta_i} s_{\alpha_i} & a_i s_{\theta_i} \\ 0 & s_{\alpha_i} & c_{\alpha_i} & d_i \\ 0 & 0 & 0 & 1 \end{bmatrix}$$

-continued $$\begin{array}{cc} R_i & t_i \\ = 3\times 3 & 3\times 1 \\ 0\ 0\ 0 & 1 \end{array}$$

The general form of transformation matrix which represents frame j (or coordinate system j) with respect to frame i can be represents as seen in Equation (21).

$$T_j^i = \begin{cases} A_{i-1}A_{i+2} \ldots A_{j-1}A_j & \text{if } i < j \\ I & \text{if } i = j \\ (T_i^j)^{-1} & \text{if } i > j \end{cases} \quad (21)$$

By multiplying and solving the $A_i$ series, the final transformation matrix $T_0^6$ can be found in Equation (22). This $T_0^6$ matrix transforms the coordinates from the world frame (frame 1st) to the tool frame (frame 6th).

$$_0^0T = \begin{pmatrix} r_{11} & r_{12} & r_{13} & p_x \\ r_{21} & r_{22} & r_{23} & p_y \\ r_{31} & r_{32} & r_{33} & p_z \\ 0 & 0 & 0 & 1 \end{pmatrix} \quad (22)$$

Figure 17:
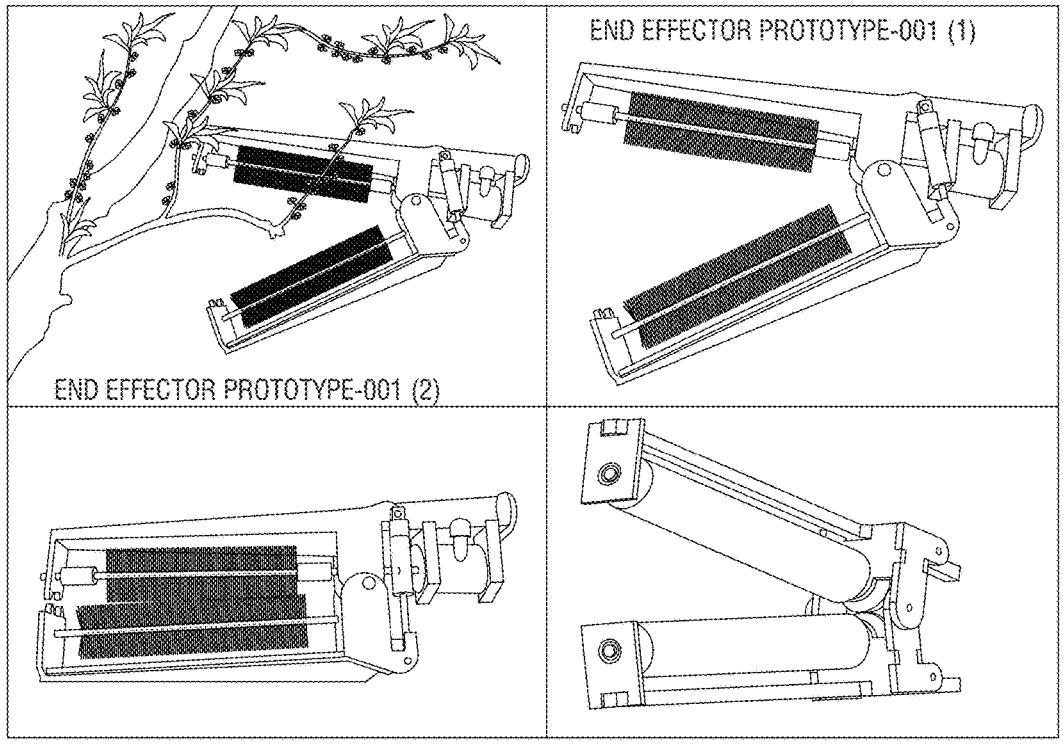
FIG. 17 is a pictorial representation of a preliminary end-effector testing and designs.

Where, $r_{11} = -c_6(c_5s_1s_4 + s_{23}(c_1s_5) - c_1c_2c_1c_4c_5 + c_1c_2c_1c_4c_5) - s_6(c_4s_1 - c_1c_2c_3s_4 - c_1s_2s_3s_4)$ $r_{21} = s_6(c_1c_4 - s_1s_4(c_2c_3 + s_2s_3) - c_6(s_1(s_{23}s_5 - c_2c_3c_4c_5 + c_4c_5s_2s_3) - c_1c_5s_4)$ $r_{31} = s_6(c_{123}c_{46} - s_{15} + s_{23}(c_4c_5c_6 - s_4s_6)$ $r_{12} = s_6(c_5s_1s_4 + s_{23}c_1(s_5 - c_2c_3c_4c_5c_2c_3s_2s_3) - c_6(c_4s_1 + c_1c_2c_3s_4 - c_1s_2s_3s_4)$ $r_{22} = s_6(s_{23}s_1s_5 - c_5(c_1s_4 - c_2c_3c_4s_1 + c_4s_1s_2s_3)) + c_6(c_1c_4 - c_2c_3s_1s_4 + s_1s_2s_3s_4)$ $r_{32} = -s_{23}(c_6s_4 + c_4c_5s_6) - c_{23}s_5s_6$ $r_{13} = s_1s_4s_5 - s_{23}c_1c_5 - c_1c_4s_5(c_2c_3 + s_3)$ $r_{23} = s_1(c_4s_2s_3s_5 - s_{23}c_5 - c_2c_3c_4s_5) + c_1s_4s_5$ $r_{33} = c_{23}c_5 - s_{23}c_4s_5$ $p_x = c_1(a_1 + a_2c_2 + a_3(c_2c_3 + s_2s_3)) + d_6(c_1c_4s_2s_3s_5 - c_1c_2c_3c_4s_5 - s_1s_4s_5 - s_{23}c_1c_5)$ $p_y = s_1(a_1 + a_2c_2 + a_3(c_2s_1 + s_2s_3)) + d_6(c_4s_1s_2s_3s_5 - c_2c_3c_4s_1s_5 - c_1s_4s_5 - s_{23}c_5c_5)$ $p_z = d_1 + a_2s_2 + a_3(c_2s_3 + c_3s_2) + d_6(c_{32}c_5 - s_{23}c_4s_5)$ $s_i = \sin \theta_i$ $c_i = \cos \theta_i$ And, $s_{ij} = \sin(\theta_i + \theta_j)$ $c_{ij} = \cos(\theta_i + \theta_j)$ Robotic End-Effector The objective of the end-effector design is to remove target peach buds and/or blossoms from a branch consistently with minimal maintenance. A variety of potential blossom removing end-effector designs were considered for the study described in the present example, including air blasts, laser beams, water jets, and mechanical methods. Each of these methods are considered to be variations to the type of end effector to be used with the robotic arm machine 10. However, for purposes of experimentation, a process of elimination approach was used in the end effector design consideration. A mechanical design simplified the problem to a force application. Two mechanical designs include a hand gripper and brush design. However, these are not meant to be limiting, and any mechanical setup capable of performing the tasks needed should be considered to be part of the invention. The brush design chosen is shown generally in FIG. 22. The brush design offers two means of force application, a normal blunt force and axial spinning force. The hand gripper offers a blunt normal force. The preliminary end-effector design was based on functionality and requirements for a full-scale robotic arm payload. An initial design comprised two 5.08 cm (2 in) diameter 25.4 cm (10 in) and 20.32 cm (8 in) longitudinally long counter rotating brushes that open and closed at an angle from a fixed point (FIG. 17). The end-effector brushes and linear actuated movement can be pneumatically powered and, as shown in the figure, weighed approximately 4.08 kg (9.0 lbs).

Figure 16:
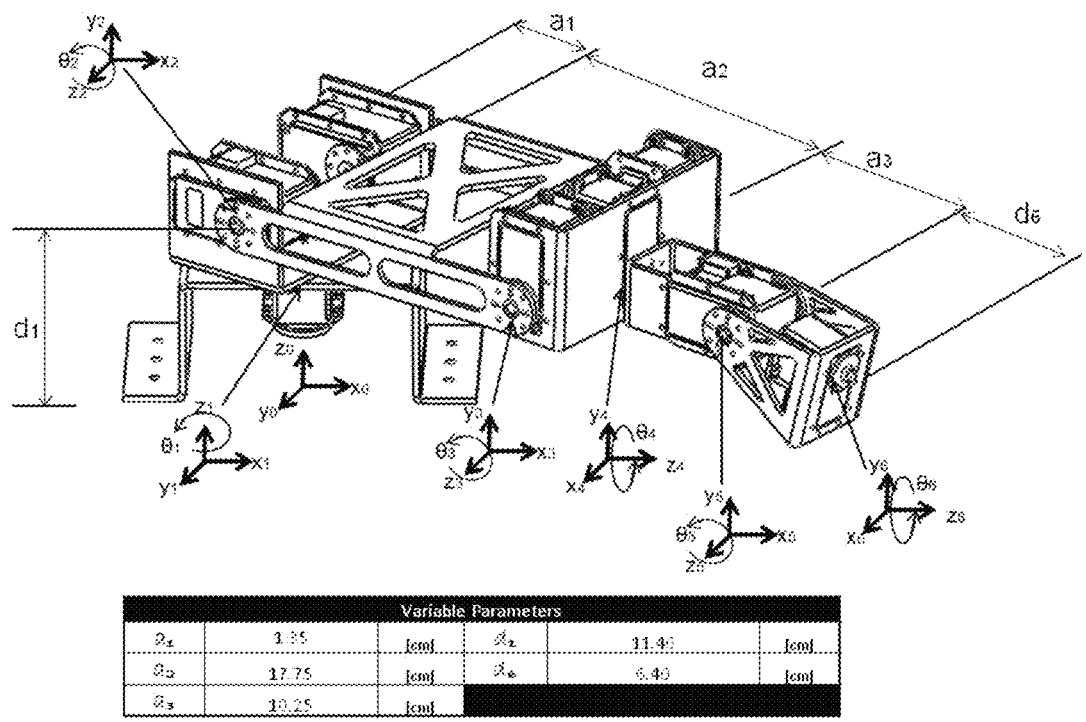
FIG. 16 is a pictorial representation of a robotic arm link parameters schematic.
Figure 18:
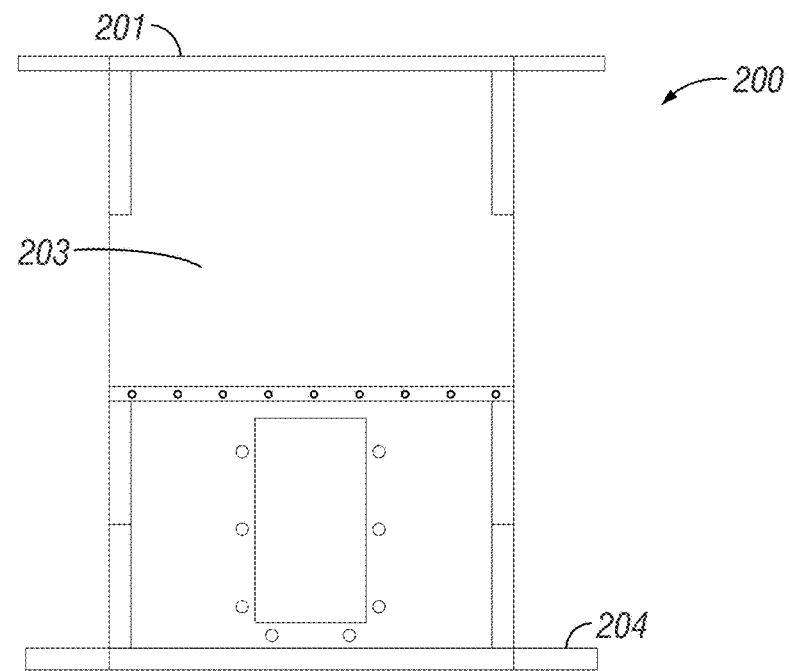
FIG. 18 is a perspective and exploded view of an end-effector housing.
Figure 18:
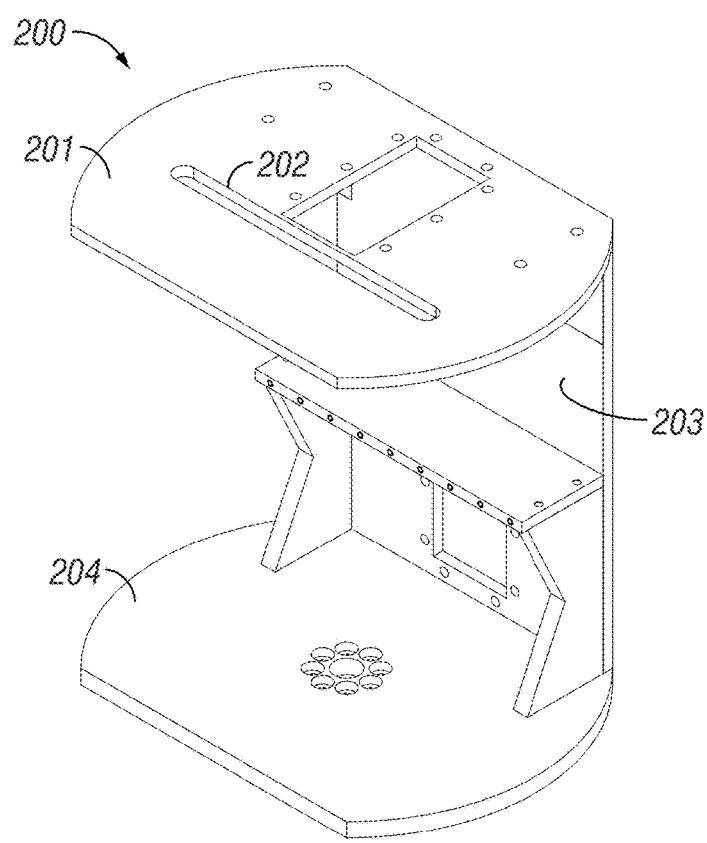

The end effector design can be divided into three parts; the linear actuation of the brushes, the power assembly for brush rotation, and the housing for the design. The payload restrictions for the end-effector design were 2.5 kg (5.5 lbs). The housing for the end-effector has been constructed out of an aluminum alloy 6011 (AA6011). However, other rigid metals, composites, plastics, and the like can be used. The end-effector housing was designed to attach directly to the six axis servomotor or the end of link d6, shown on FIG. 16. The housing was 13.3 cm (5.25 in) long 12.57 cm (4.95 in) wide with mounts for a power assembly and two servo motors. FIG. 18 shows views of the end-effector housing 200. As will be understood, the housing includes a top plate 201 having a slot 202 that will allow brushes 101, 102 to pass through and also move in a linear manner. The housing 200 also includes a side plate 203 and a bottom plate 204. Additional components of the housing 200 can include a railing mount and stiffener supports for adding support to the housing 200.

Figure 19:
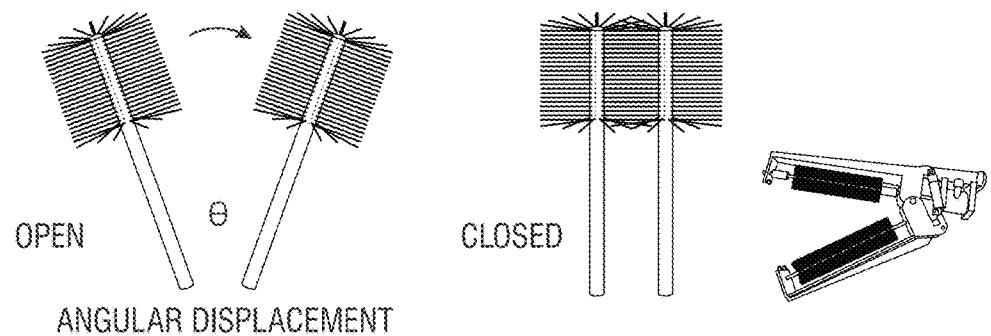
FIG. 19 is a pictorial representation of an end-effector brush translation schematic.
Figure 19:
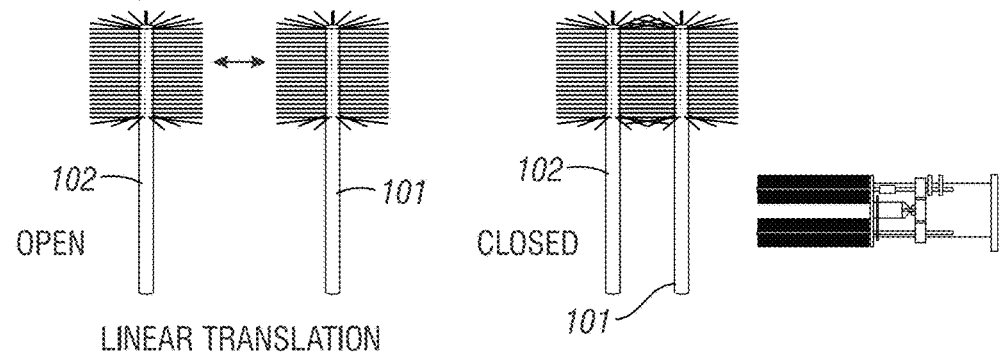

The linear open and close transverse motion of the brushes is a servo motor, rail, and carriage design. While it is imagined that the end effector can be a swinging gate (angular displacement) brush delivery system of the preliminary design, the exemplary version as shown includes brushes 101, 102 transverse linearly in one plane (FIG. 19). The angular displacement of the servo motor can be converted to a linear translation. The angular displacement and brush rotation are actuated by ROBOTIS RX-28 servomotors. A displacement arm 103 can be attached to the servomotor 108 with two links 104, 105 connected to carriages 106, 107 on a rail system. Each link 104, 105 is positioned at an angle of 45°, as the servo motor 108 displaces in a clockwise (CW) direction, the angle of the links increase creating a linear translation on the rail.

Figure 20:
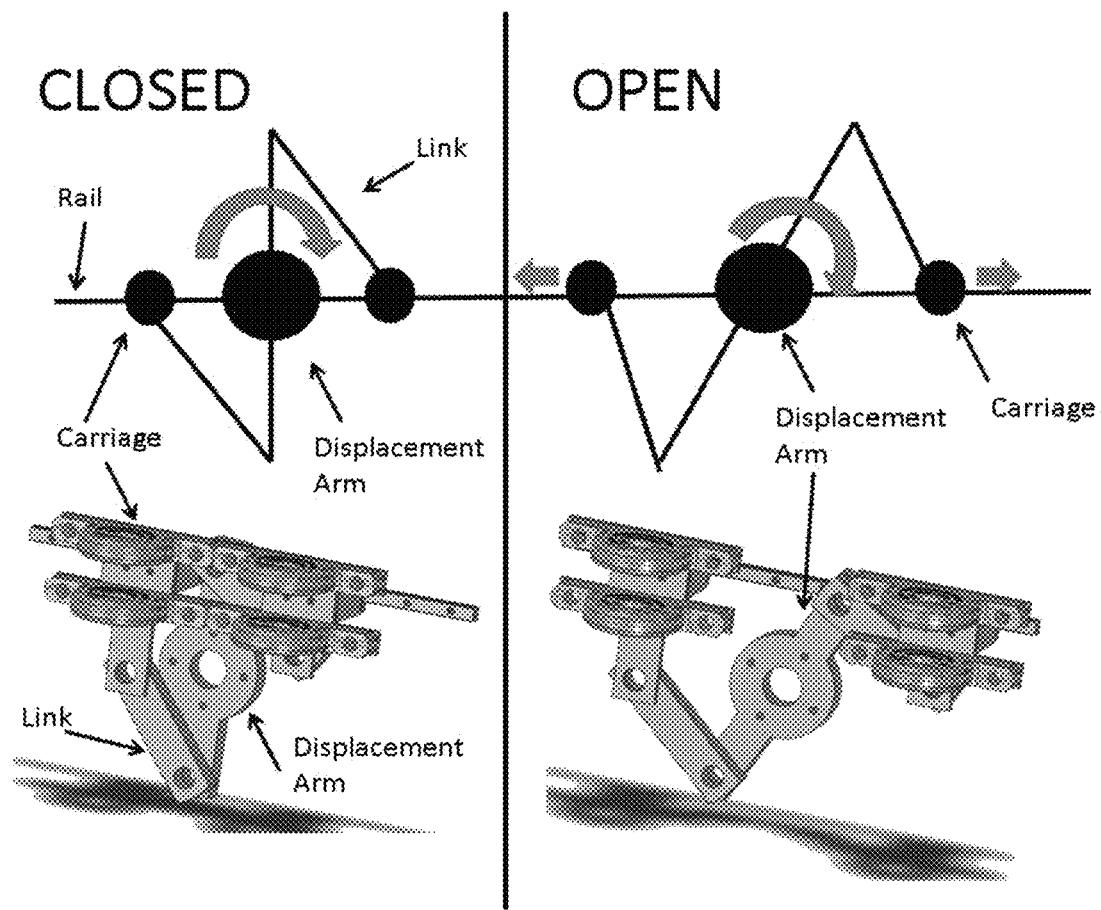
FIG. 20 is a pictorial representation of an end-effector translation assembly schematic.

The diameter thickness of a fruit bearing peach shoot is approximately 0.317 cm (0.125 in) to 0.635 cm (0.250 in). Thus, the spacing for the linear motion brushes 101, 102 when open has been designed at a width of 1.9 cm (0.75 in) for safe branch transversal. At 0° (displacement arm completely vertical) the carriages are centered and the brushes are closed, at 31° (CW) the carriages transverse the brushes to the open position (FIG. 20). The carriages carried two bearings with a free spinning drive shaft that attached to the brushes.

Figure 21:
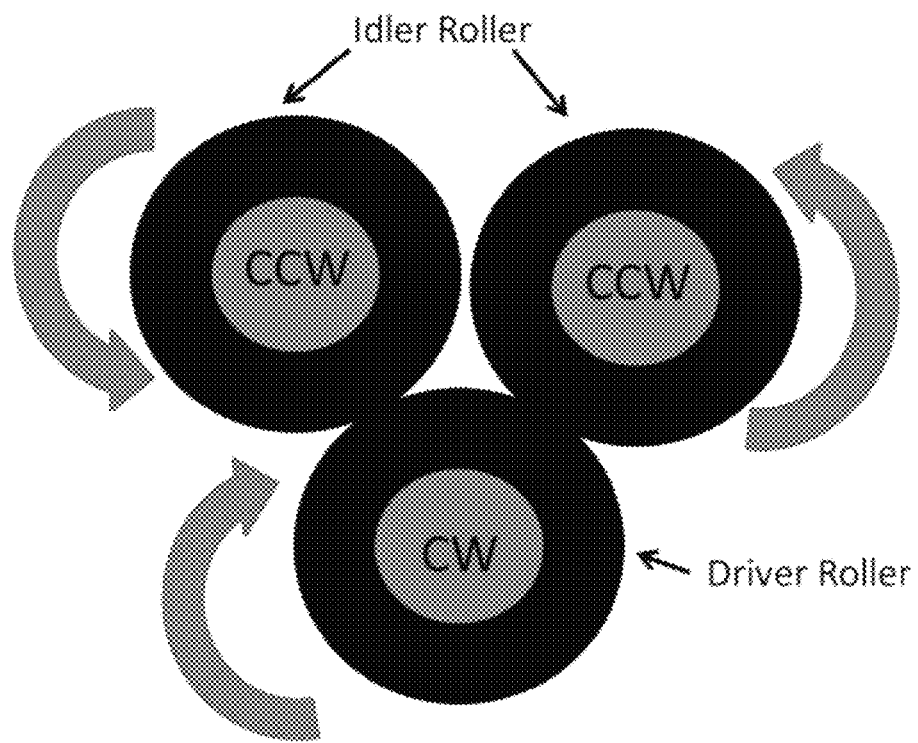
FIG. 21 is a pictorial representation of end-effector drive roller schematic.

When the brushes close on a selected blossom target, two 2.54 cm (1.0 in) neoprene idler roller wheels 110 connect to a neoprene 3.17 cm (1.25 in) driver roller 109 powered by the second servo motor 115, mounted parallel to the wheel set. When engaged, the drive roller 109 spins the idler rollers 110 along with the brushes 101, 102 that are attached to aluminum free spinning rollers 110 (FIG. 21). The free spinning roller design allows for a non-engaged brush to simply roll over branches and/or blossoms without applying a tangential or normal force. A perspective view of an end effector 100 with associated components can be seen in FIG. 22.

Figure 43:
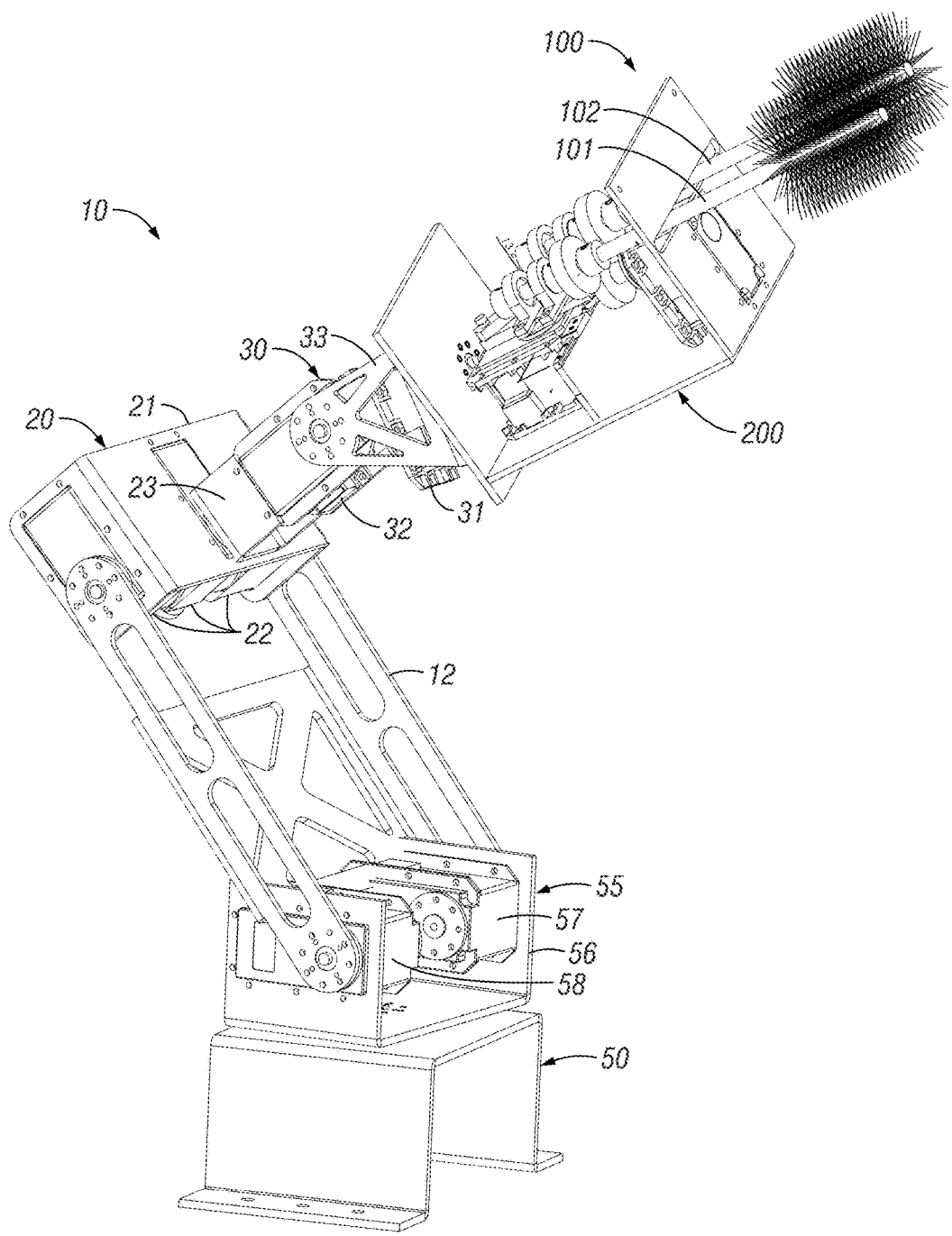
FIG. 43 is a perspective view of a robot and end effector device according to some aspects of the invention.

A view of the robotic arm 10 with the end effector 100 positioned thereon is shown in FIG. 43. The arm 10 is on a base 50, which includes a motor (not shown) mounted thereto. The base motor provides rotational movement to arm 100 and therefore, the arm can be understood to be rotatably and/or pivotably connected to the base 50. The base 50 can be generally any shape or size capable of supporting the arm 10. Furthermore, the base 50 may be connected to a vehicle or portion of a vehicle. Still further, it is contemplated that the base be replaced with an exoskeleton-like member that can be manipulated by a user to provide mechanical manipulation and/or activation of the arm 10 and/or end effector 100 to aid in the thinning of blossoms at a selected location.

Connected to the base 50 is a waist assembly 55 including a motor mount 56 and motors 57, 58. Extending from the waist assembly 55 is a lower link 12 that extends from the waist assembly 55 to an elbow assembly 20. The motors 57, 58 provide for rotational movement to the lower link 12, which extends and retracts the arm 10. The lower link 12 is a rigid member comprising steel, plastics, composites, or the like, and provides length to the arm 10. When the arm 10 is mechanical in nature, linkages, electrical connections, or the like can be included with the lower link to transfer an electrical or mechanical activation at the base 50 to the upper or distal components of the arm 10. The link 12 is pivotably connected to both the waist assembly 55 and the elbow assembly 20.

The elbow 20 is an assembly including a mount member 21 housing three motors 22. The motors 22 can provide varying movement to the upper or distal components of the arm 10. For example, the outer motors are pivotably connected to an upper end of the lower link 12 and provide rotational movement about said connection. The middle motor is rotatably and/or pivotably connected to a rail member 23 extending distally from the elbow 20, and provides rotational movement to the components extending therefrom. The rail member 23 extends outward from the mount 21. Connected to the elbow 20 is a wrist assembly 30. The wrist assembly 30 includes a first motor 31 and a second motor 32. The second motor 32 is pivotably connected to a wrist link 33 so as to provide pivoting movement from the motor 32 to the link 33. A portion of the wrist link 33 is sandwiched between the first motor 31 and the lower plate 204 of the housing 200 for mounting the end effector 100. Therefore, the motor 31 provides rotational movement to the housing 200 and end effector 100 attached thereto.

The end effector has been previously shown and described, and works with the arm 10 to selectively thin blossoms on a tree. Therefore, as is understood, the links of the arm are driven to extend, retract, and/or rotate to position the end effector 100 at a location to selectively thin blossoms from a branch.

Furthermore, as mentioned, the arm 10 can include mechanical components and/or a joystick or other direction input as well as an end effector activator. The direction input can be a joystick that is manipulated by a user to position the end effector at a location. An activator, such as a trigger or other mechanism, can be included to activate the end effector by the user to remove the blossoms from the branch as the user decides, making the arm 100 more of a hand-held device.

The motors, as disclosed elsewhere in the present disclosure, can be servo motors or other types of motors. Still other variations obvious to those skilled in the art are to be considered a part of the invention. This can include more or less motors, linkages, pulleys, lighting systems, and the like.

EXAMPLE

Robotic Arm Stand, Test Plate and Test Rods

The robotic arm 10 was tested by placing on a stand to mimic a vehicle in the orchard and increase the workspace range. The quarter-scale arm was elevated 22.86 cm (9 in) from ground on a platform constructed of 2.19 cm (0.865 in) thick 4130 alloy steel. The base plate is 22.86 cm (9 in) length by 15.24 cm (6 in) width and the top plate is 10.16 cm (4 in) length by 12.7 cm (5 in) width supported by eight 0.317 cm (0.125 in) 4130 steel square tubing. The platform was attached to a test plate for experimental study at test station 1.

The experimental test plate was a 101.6 cm (40.0 in) length 64.7 cm (25.5 in) width 1.27 cm (0.50 in) thickness 4130 steel plate. The robotic arm 10 and stand was centered in width and attached to the first 22.86 cm (9 in) length 7 of the test plate. At 17.78 cm (7.0 in) length from the robotic arm stand base is a column of seventeen 2.19 cm (0.865 in) threaded holes evenly spaced 3.81 cm (1.50 in) width apart. The threaded hole pattern was repeated at 7.62 cm (3 in) intervals on the test plate length, for a total of nine rows. The Cartesian coordinate convention for the test plate and robotic arm is as follows.

x direction—Positive length of the test plate, (0 being the zero position of the robot)
y direction—Width of the plate, (0 being the middle of the test plate, — right)
z direction—Height from the plate, (0 being the surface of the plate, + up)

The experimental test plate has 153 2.19 cm (0.865 in) threaded holes for mounting of test equipment in the robotic arm workspace. Threaded rods 2.19 cm (0.865 in) in diameter were used to create branch like structures at various lengths and heights on the test plate. Target rods were created and placed at various locations for testing. The target rods were 0.865 in diameter and were signified by white, yellow and red tape. The center of the white was the target position with the median of the yellow 2.54 cm (1.0 in) in either longitudinal direction representing the first standard deviation. The yellow and red tape's longitudinal length medians indicated the first and second standard deviation respectively.

An INSTRON model No. 4444 Universal Testing machine (Instron, Norwood, Mass.) was used for the blossom removal force study. A 2.54 cm (1.0 in) nylon brush was attached to the crosshead of the INSTRON. The brush was used to apply a normal point force to the blossom. The INSTRON brush crosshead configuration had a total vertical travel of 500 mm (19.7 in) and a vertical test space of 658 mm (25.9 in). The INSTRON has a vertical test speed of 0-1000 mm/min (0-40 in/min) and a load range of 0-2000 N (0-450 lbf), with an accuracy to the nearest tenth of a kilogram/pound force. Samples were taken at a test speed of 127 mm/min (5 in/min). The INSTRON Series 4400 control panel software was used for data acquisition. The vertical transversal, time and force data were recorded and stored in Excel spreadsheets.

A Sony HDR-CX110 Digital HD Video Camera Recorder was used to capture the tangential blossom force test. The blossom removal images were recorded at 29.97 frames per second (fps) with a resolution of 640×360 pixels. The shutter speed was automatically set to 1/30 for an average record time of 48 s. The camera was placed underneath a peach branch at a 45 degree angle parallel to the blossom. The camera was fixed and mounted to the main test plate. The camera was triggered by the remote and was connected to a PC for image collection.

The Conviron GR series growth chamber was used to bloom the peach blossom cultivars used in this study. The GR growth chamber is a walk-in controlled environment unit. The chamber offers low to moderate level light intensities using multiple light canopies. The airflow design directs air downward toward the floor and then redirects the returning air upward between the plants and through the lamp canopies. The chamber also offers humidity and temperature control in conjunction with cyclic automated lighting patterns.

The peach cultivars shoots were harvested. The chamber's temperature and humidity were set at 27° C. (80.6° F.) and 80% with the lights cycling 12 hours on and 12 hours off. The peach blossom cultivars buds showed signs of pink formations within 72 hours and bloomed within 6 days in the chamber.

The vision system is a correlation-based stereo vision design used to map the blossoms in 3D space.

Figure 23:
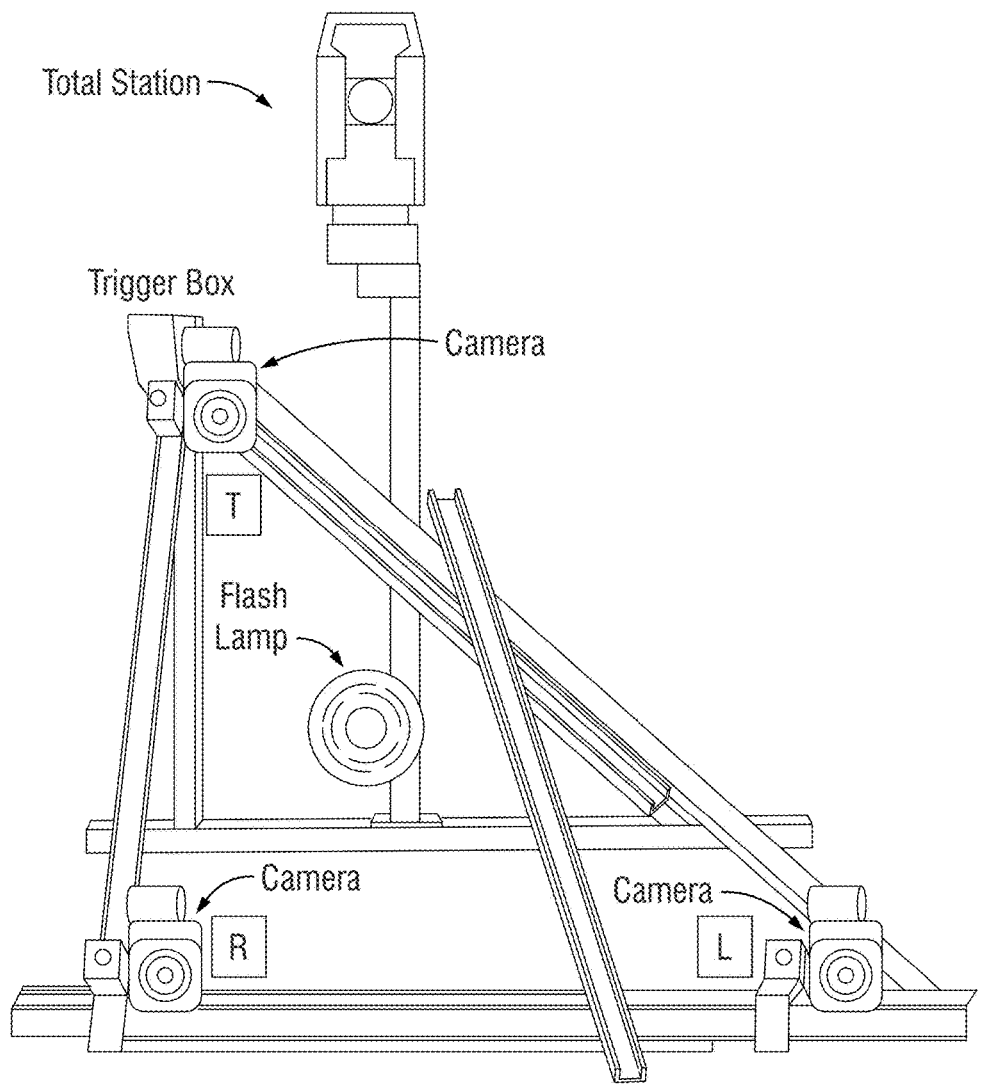
FIG. 23 is a pictorial representation of a vision system setup.
Figure 24:
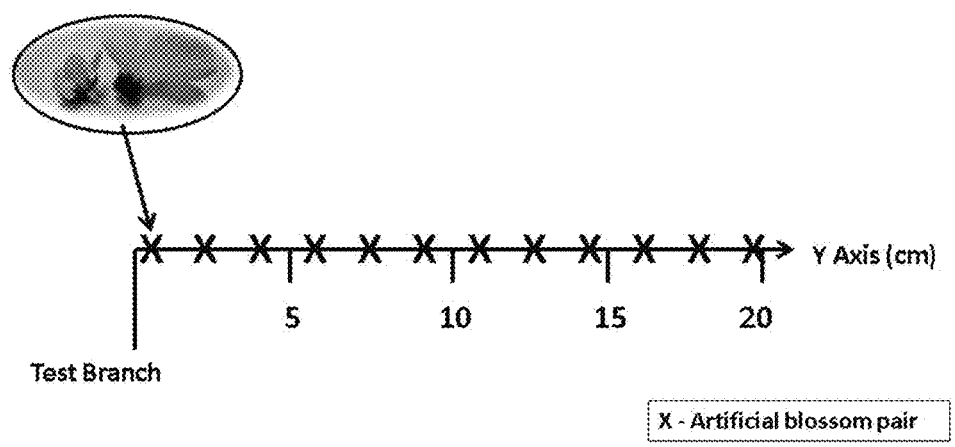
FIG. 24 is a pictorial representation of a heuristic thinning experimental setup.

The stereo vision system was mounted on a flatbed trailer pulled between the tree rows by an orchard tractor (FIG. 23). Three digital color cameras (model D200 with AF Nikkor 20 mm lens, NIKON Company, Japan) were mounted in a trinocular "L" configuration with the cameras spaced at 0.8 m (2.62 ft) apart. This baseline gives a theoretical accuracy of 5 mm (0.196 in) at the distance of the far blossoms. The "L" setup is chosen because the cameras form two different baselines, which make occluding shoots less likely to obstruct the view in both camera pairs, especially those aligned with one baseline. The plane of the trinocular "L" is positioned perpendicular to the "V" and inclined 45o from horizontal to allow full view of the proximal limb of the "V" that inclines into the same row containing the stereo vision system, and is approximately 3 m (9.84 ft) away. With this configuration, the trees are in the field of view, switching to 16 mm (0.629 in) lenses to view taller trees, if necessary.

The stereo images (each 2592×3872 pixels, 24 bit color) were acquired at night using high intensity flash illumination (model Porty EHT 1200, Hensel Studiotechnik GmbH & Co., Germany). Nighttime flash illumination is advantageous because it synchronizes the image acquisition, eliminating any image blurring due to light scattering, and provides a simple and effective method of segmenting the blossoms on the proximal limb from the remaining tree canopy and from the blossoms on the distal limb or on other trees in the background. After each digital stereo image triplet is acquired, the ground truth 3D locations of a set of blossoms from several shoots on the proximal limb were determined using a total station (model 55-305R, CST/ Berger, Watseka, Ill.) equipped with a targeting blaser. The total station, of the quality used in this research, has a resolution of <1 mm (0.04 in) in the fronto-planar plane and 3 mm (0.11 in) in depth with repeatability determined experimentally to be +/−1 mm (0.04 in).

Experimental Test Conditions—Blossom Force Test

For this example, the normal and tangential forces required to remove a peach blossom from a branch were examined. Both tests used a 2.54 cm (1.0 in) nylon test brush for loading. The normal force test used a point loading approach while the tangential force test employed a centripetal force. The centripetal and point normal force tests were performed on the Saturn and Loring cultivar respectively. Each blossom set was artificially bloomed in the Conviron growth chamber prior to testing.

The Instron crosshead brush configuration was used to conduct the normal force blossom removal tests. The blossoms shoots were fixed horizontally and vertically. The blossoms were also tested in the bud and full blossom phase (Table 4.4).

TABLE 4.4

Blossom removal normal force case study chart

| Run No. | Date | Number of Trials | Blossom Shoot Configuration | Blossom Stage | Average Force (lbf) | Standard Deviation |
|---|---|---|---|---|---|---|
| LP01 | 40209 | 8 | Hor | Bloom | 0.11 | 0.052 |
| LP02 | 40209 | 10 | Hor | Bud | 0.09 | 0.025 |
| LP03 | 40209 | 10 | Vert | Bloom | 0.13 | 0.026 |
| LP04 | 40209 | 8 | Vert | Bud | 0.07 | 0.019 |
| LP05 | 41009 | 16 | Hor | Bud | 0.12 | 0.054 |
| LP06 | 41009 | 10 | Vert | Bud | 0.16 | 0.050 |
| LP07 | 41009 | 14 | Vert | Bud | 0.16 | 0.074 |
| LP08 | 41309 | 10 | Hor | Bloom | 0.11 | 0.037 |
| LP09 | 41309 | 12 | Vert | Bloom | 0.13 | 0.040 |

The top side of a thinning brush was placed on the surface of the Loring peach cultivar blossom. In the horizontal position, the shoot was attached to a wooden surface with the blossom free-floating above a 3.8 cm (1.5 in) wide rectangular cavity, creating a dynamic flexure test. In the vertical position, the shoot was clamped at the base and the free-floating blossom was positioned under the brush.

The Instron vertical test speed was fixed at a constant rate of 127 mm/min (5 in/min) for this study. The speed was set at this rate to capture the detachment of the blossom. The brush bristles were placed on the surface of the blossom as the Instron loaded the blossom. The time, linear deflection, and force were recorded until detachment of the blossom occurred. Note, the normal force tests were conducted prior to the beginning of this study by Benjamin Kemmerer a graduate student in Agricultural and Biological Engineering at The Pennsylvania State University. The normal force test information and results presented in this investigation were not previously published and were intended for this study.

The end-effector 100 provided the centripetal motion for the tangential force test. The end-effector was attached vertically to the test board. A Saturn peach cultivar shoot was attached horizontally to a 0.95 cm (3/8 in) threaded rod fixed 16.51 cm (6.5 in) above the test board surface and through the target position of the end-effector brushes. A camera was placed underneath the rod at a 45 deg angle parallel to the shoot facing the end-effector. The tangent of the end-effector brush bristles was placed on the surface of the Saturn blossom.

The speed of the brushes was increased linearly until detachment of the blossom occurred. The actuation of the servo motor that controls the spinning action of the brushes was a binary voltage step function. The binary step voltage was converted to meters per second. The experiment was recorded at 27.9 frames per second. At each binary step, increase of voltage the time was noted by voice actuation and highlighted on the frame capture (check this sentence). The tangential force study consisted of 30 recorded tests. The repetitions were chosen to meet or exceed the standard normal distribution at a 95% confidence level.

Kinematic Robotic Arm Positioning Tests

Figure 42:
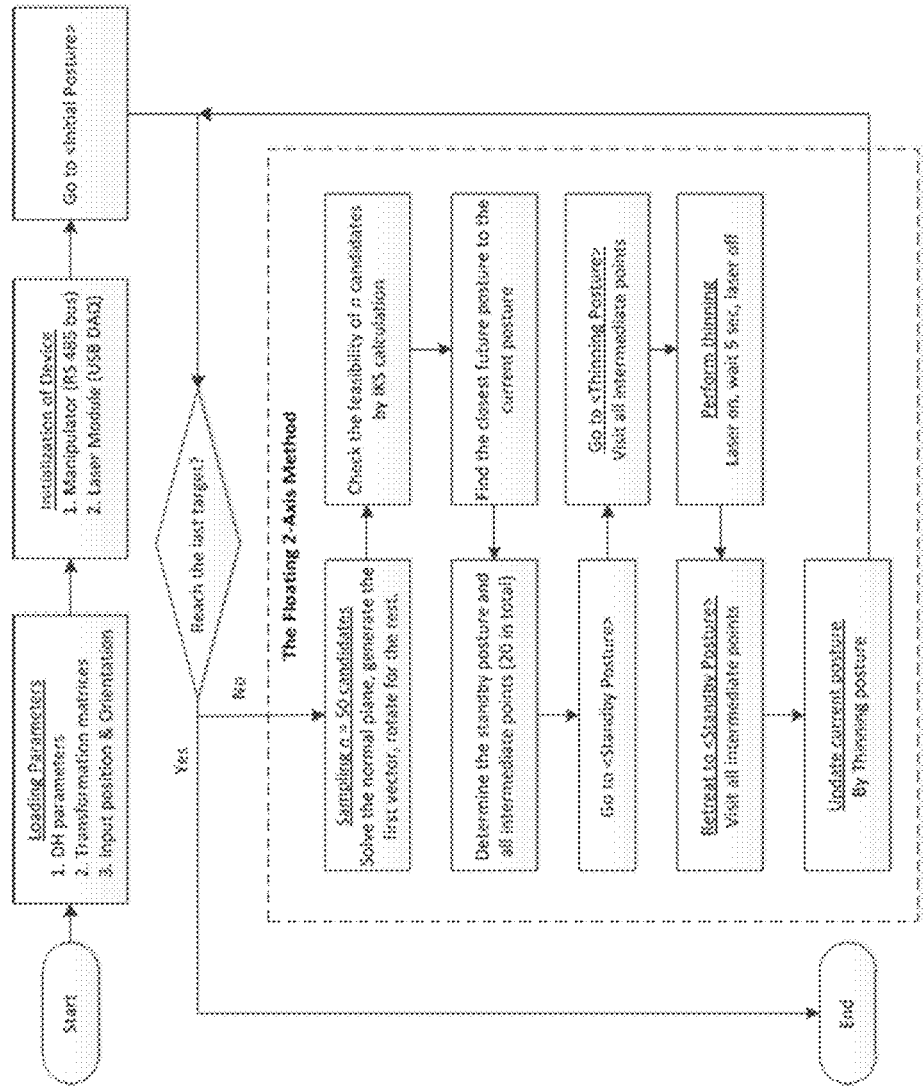
FIG. 42 is a pictorial representation of a kinematic software flowchart.

For the kinematic positioning study, four 3D points were chosen within the robotic arm workspace. The four locations were represented with target position branches. The robotic arm kinematic software (see, for example, FIG. 42) was then programmed with the four 3D target coordinates. The testing algorithm placed the robotic arm at each position in a random order. The robotic arm paused at each target area for measurement. The robotic arm placement 3D distance from the target position was measured with a level and calipers. The target to actual position difference was then recorded in an Excel spreadsheet. The kinematic positioning test consisted of 120 repetitions. See Table 4.5 for the target positioning test matrix. The repetitions were chosen to meet or exceed the standard normal distribution at a 95% confidence level.

TABLE 4.5

Kinematic position case study chart

| Run No. | Date | Number of Trials | Target Position (cm) | | |
|---|---|---|---|---|---|
| | | | x | y | z |
| KS01 | May 2, 2013 | 30 | 30.94 | −11.2 | 17 |
| KS02 | May 2, 2013 | 30 | 38.44 | 0 | 33 |
| KS03 | May 4, 2013 | 30 | 30.94 | −22.75 | 53 |
| KS04 | Jun. 2, 2013 | 30 | 30 | 0 | 17 |

End-Effector Positioning Tests

For the end-effector positioning test, three target positions were chosen within the robotic arm workspace. The three locations were represented with target position branches. The robotic arm kinematic software was then programmed with the three target coordinates. The end-effector was set at 90°, placing the branch perpendicular to the brushes. The end-effector brushes were open at a distance of 1.905 cm (0.75 in) as the robotic arm moved into position. The robotic arm paused while the end-effector brushes closed on the target at each target area for measurement. The testing algorithm placed the robotic arm and end-effector at each position in a random order. The center of rotation of the end-effector brushes was measured from target with a level and calipers. The target to actual position difference was then recorded in an Excel spreadsheet. See Table 4.6 for end-effector placement test matrix. The end-effector positioning test consisted of 90 repetitions. The repetitions were chosen to meet or exceed the standard normal distribution at a 95% confidence level.

TABLE 4.6

End-effector position case study chart

| Run No. | Date | Number of Trials | Target Position (cm) | | | Branch Thickness (cm) |
|---|---|---|---|---|---|---|
| | | | x | y | z | |
| EES01 | 60413 | 30 | 50.8 | −9.28 | 38 | 0.825 |
| EES02 | 60513 | 30 | 50.8 | −23 | 38 | 0.825 |
| EES03 | 60613 | 30 | 30.94 | −22.75 | 53 | 0.825 |

Heuristic Thinning Tests

The heuristic thinning test study was conducted in two parts. For one series of tests, the blossom coordinates were manually added to the heuristic algorithm. In the second series, the vision system automatically loaded the blossoms coordinates into the heuristic thinning algorithm.

The heuristic study consisted of a test branch being mounted at an x position of 50.8 cm (20 in) and a z position of 38 cm (15 in), and placed perpendicular to the front of the robotic arm. The test branch varied from 10 cm (3.93 in), 15 cm (5.90 in) and 20 cm (7.87 in) along they axis. Three artificial blossoms were placed every 5 cm (1.96 in). The end-effector was set at 90°, placing the branch perpendicular to the brushes. The end-effector brushes were open at a distance of 1.905 cm (0.75 in) as the robotic arm moved into position and removed the blossom according to the spatial thinning algorithm. The blossom positions with and without blossoms were then counted and recorded in an Excel spreadsheet. See Table 4.7 for the heuristic thinning test matrix. The heuristic thinning test consisted of 60 repetitions. The repetitions were chosen to meet or exceed the standard normal distribution at a 95% confidence level.

TABLE 4.7

Heuristic thinning case study chart *note HTV is with vision system

| Run No. | Date | Branch Length (cm) | Blossom count | Number of Trials |
|---|---|---|---|---|
| HT01 | Sep. 21, 2013 | 10 | 6 | 10 |
| HT02 | Sep. 23, 2013 | 15 | 9 | 10 |
| HT03 | Sep. 24, 2013 | 20 | 12 | 10 |
| HTV04 | Sep. 24, 2013 | 10 | 6 | 10 |
| HTV05 | Sep. 25, 2013 | 15 | 9 | 10 |
| HTV06 | Sep. 26, 2013 | 20 | 12 | 10 |

Experimental Results

Experimental results of selective blossom thinning according to at least one aspect of the invention are addressed in the proceeding sections.

Blossom Force Test Analysis

The normal and tangential force required to remove a peach blossom from a fruit-producing shoot was investigated. For the normal force test, Loring peach blossoms were forced into bloom and tested using an Instron force loader. The Instron was used to simulate the perpendicular force acting on a bud and/or blossom. The shoot and blossom combination was tested horizontally and vertically for blossom removal. The blossoms were also tested in the bud and full bloom stages. The force, time and distance of blossom elongation before failure were recorded. After 98 test runs, the observed average normal force needed to remove a blossom from a shoot was approximately 0.533 N (0.12 lbf), with a confidence level of 95% and a margin of error of +/−9.9%, giving a range of 0.44 N to 0.57 N (0.10 lbf-0.13 lbf). The largest recorded force value from each test trial was used to calculate the required averaged removal force. The y axis is the force in pound force and the x axis is the time duration in seconds of the sample.

Figure 25:
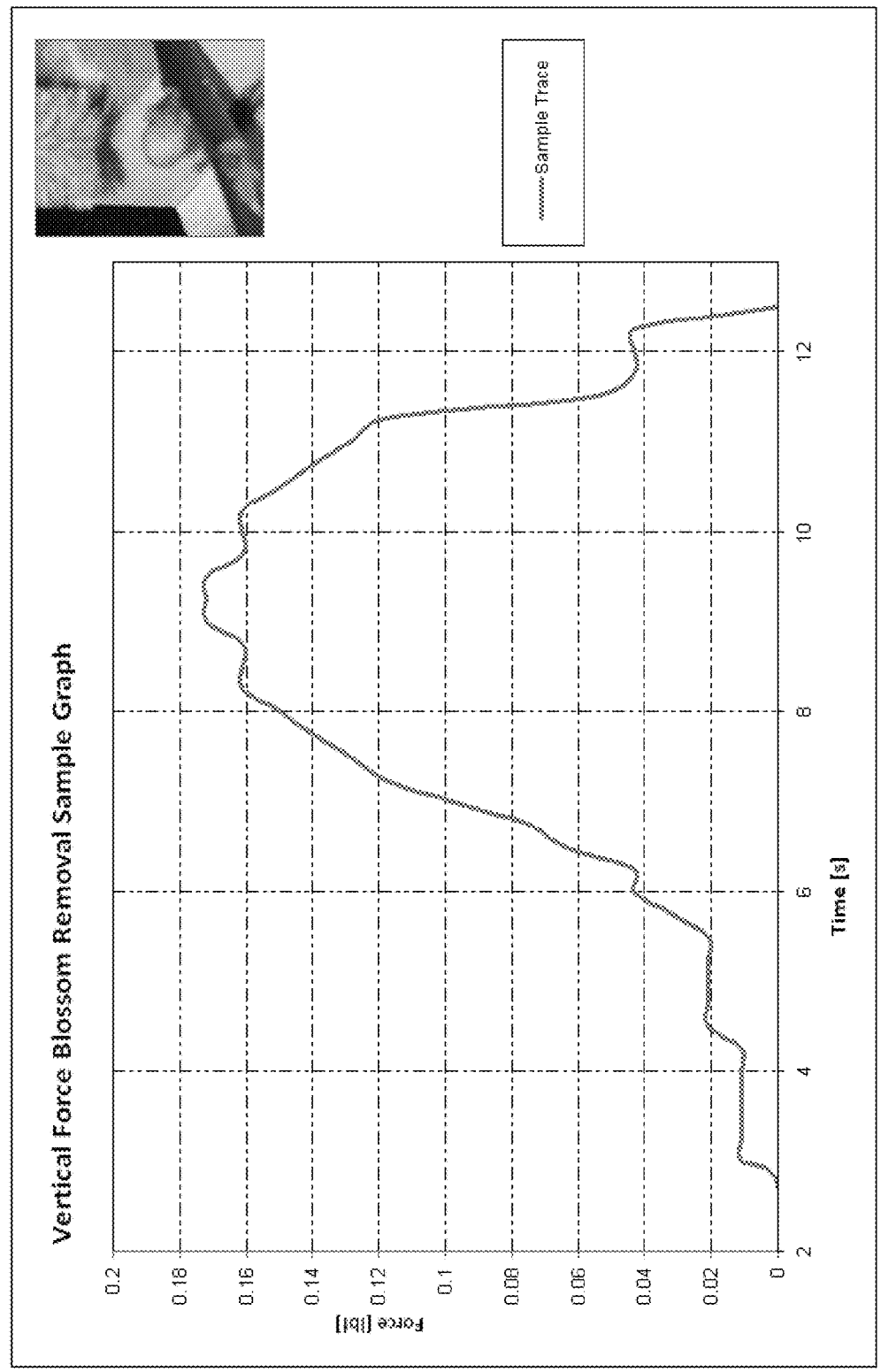
FIG. 25 is a pictorial representation of a Normal Force blossom removal graph (vertical)
Figure 26:
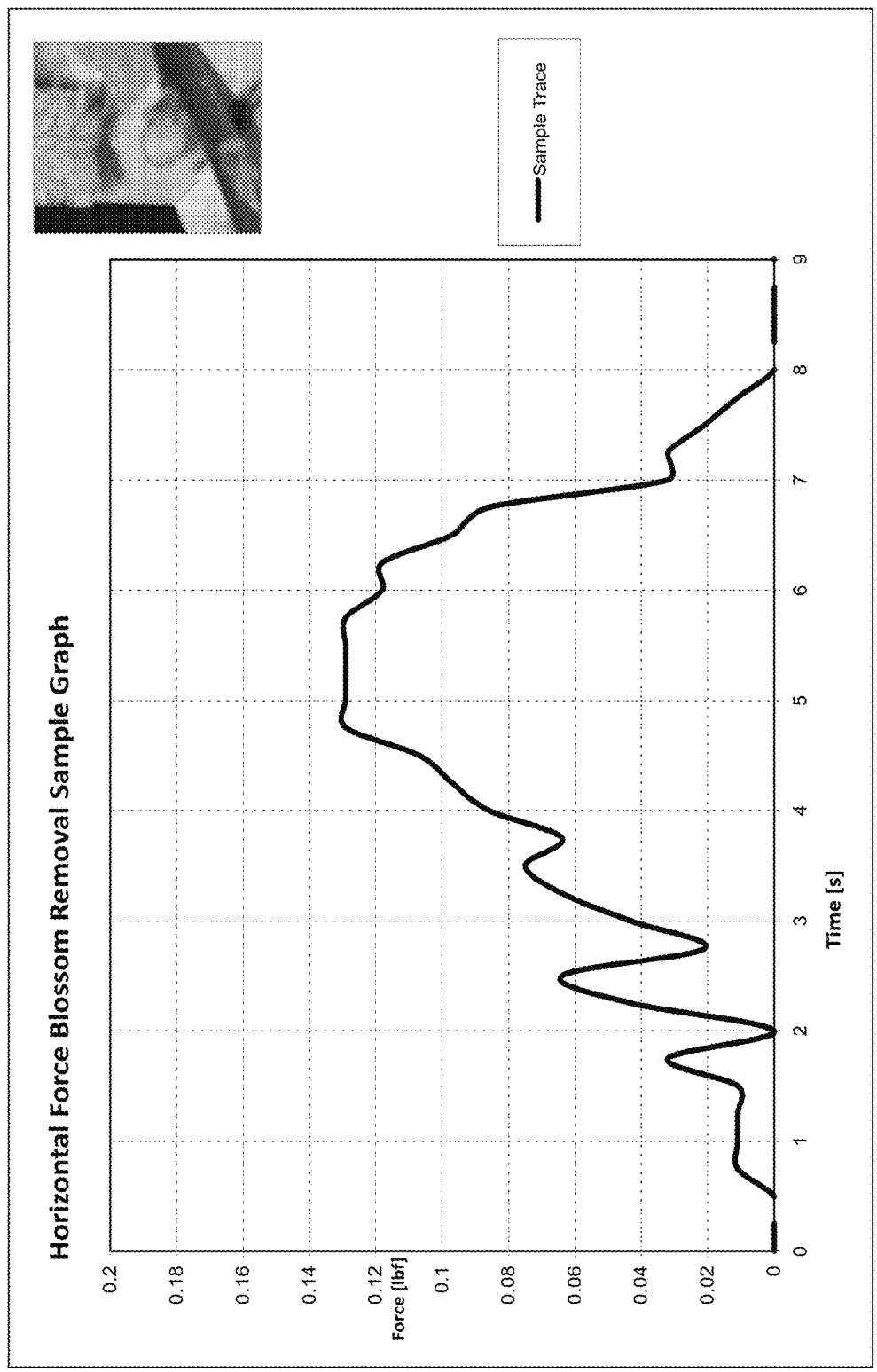
FIG. 26 is a pictorial representation of a Normal Force blossom removal graph (horizontal)
Figure 27:
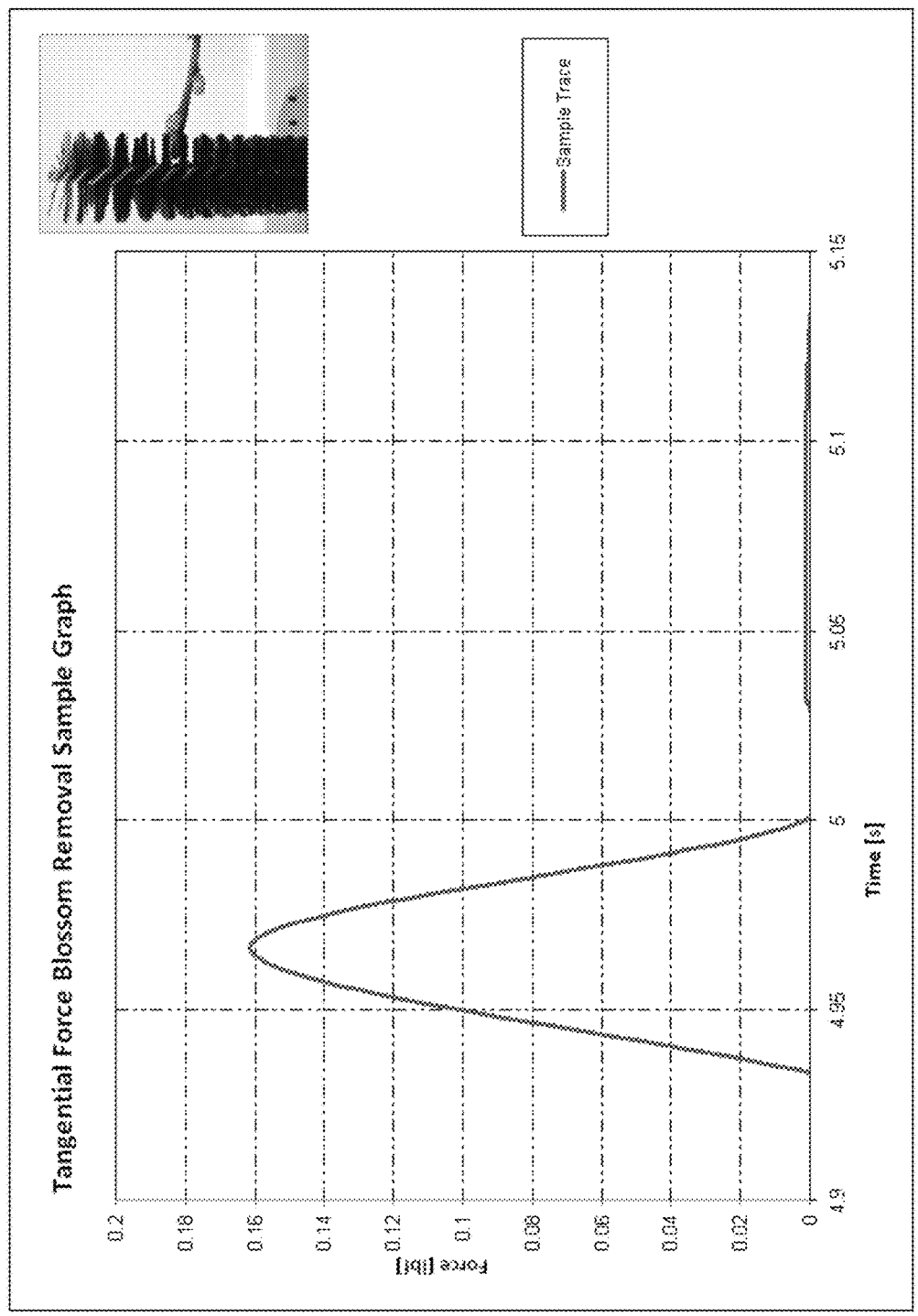
FIG. 27 is a pictorial representation of a Tangential Force blossom removal graph.
Figure 28:
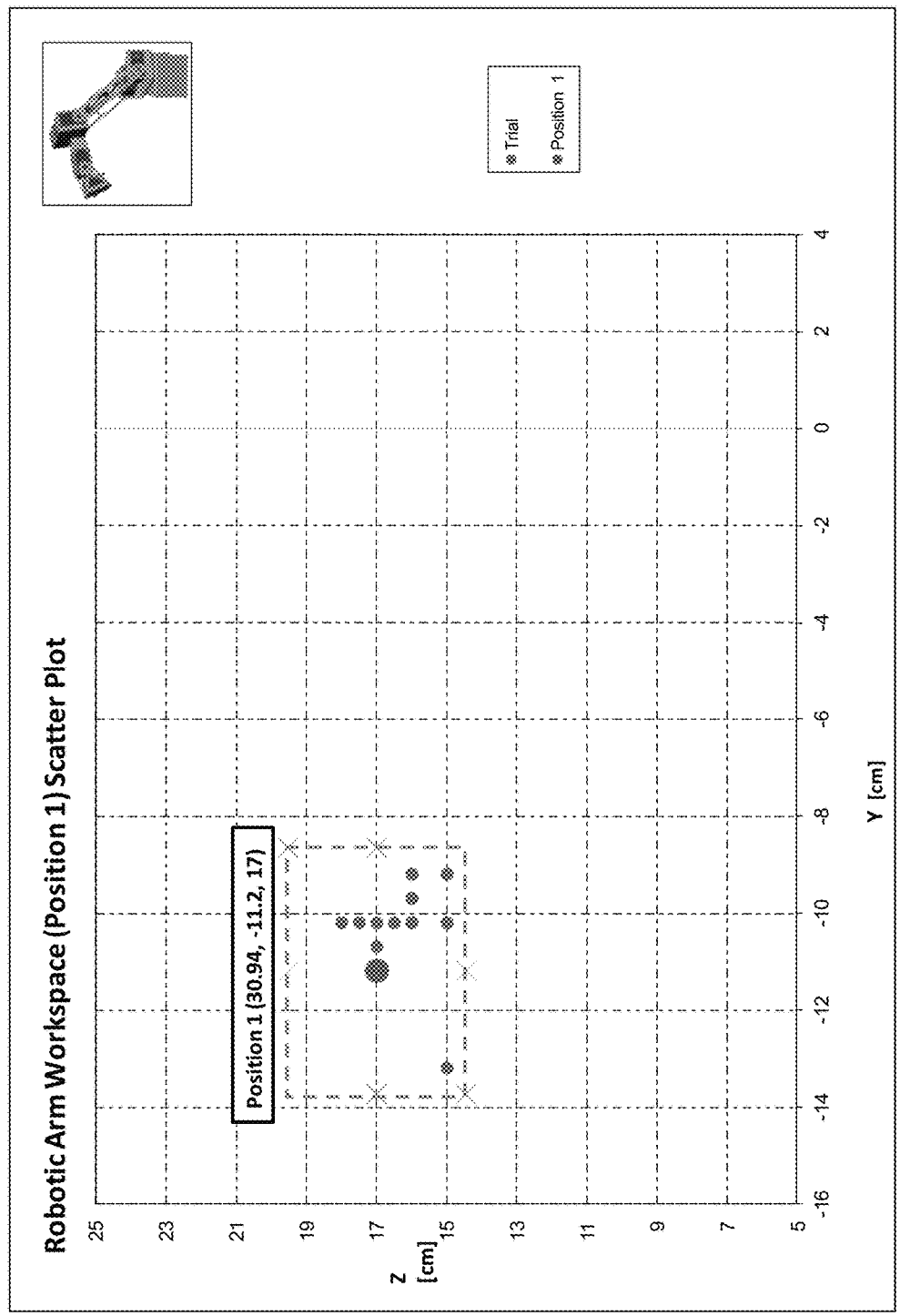
FIG. 28 is a pictorial representation of a kinematic positioning scatter plot (position 1)
Figure 29:
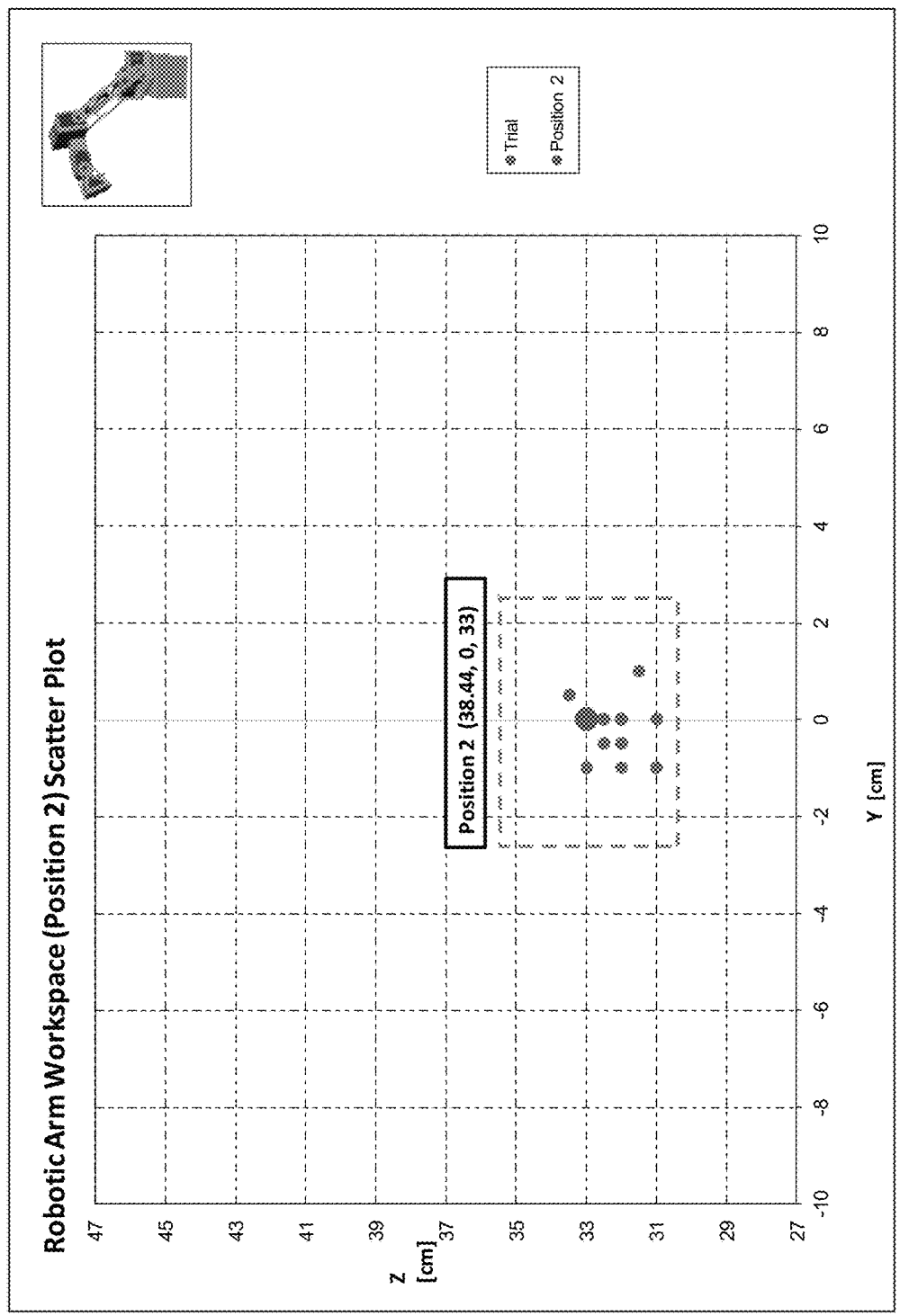
FIG. 29 is a pictorial representation of a kinematic positioning scatter plot (position 2)
Figure 30:
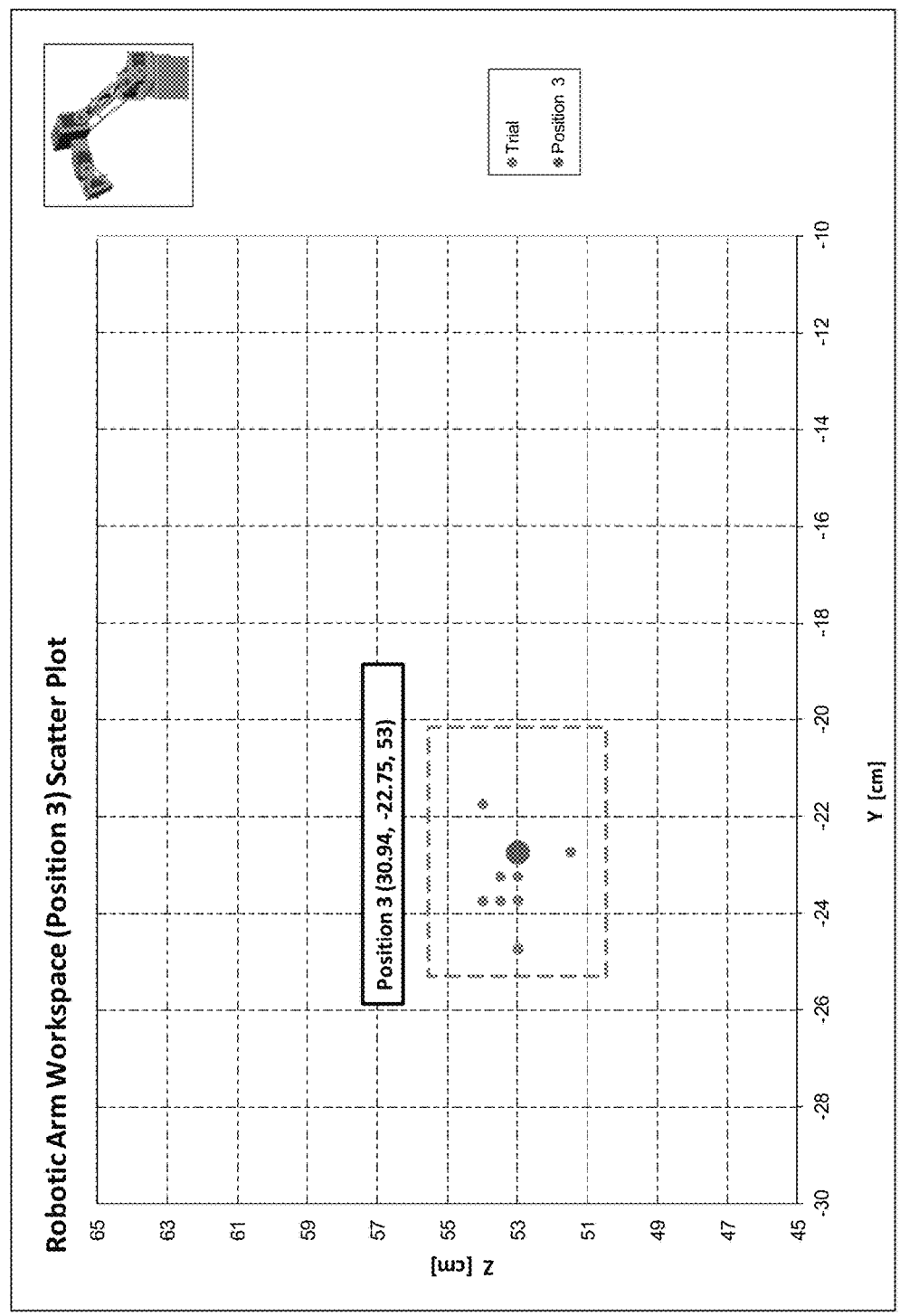
FIG. 30 is a pictorial representation of a kinematic positioning scatter plot (position 3)
Figure 31:
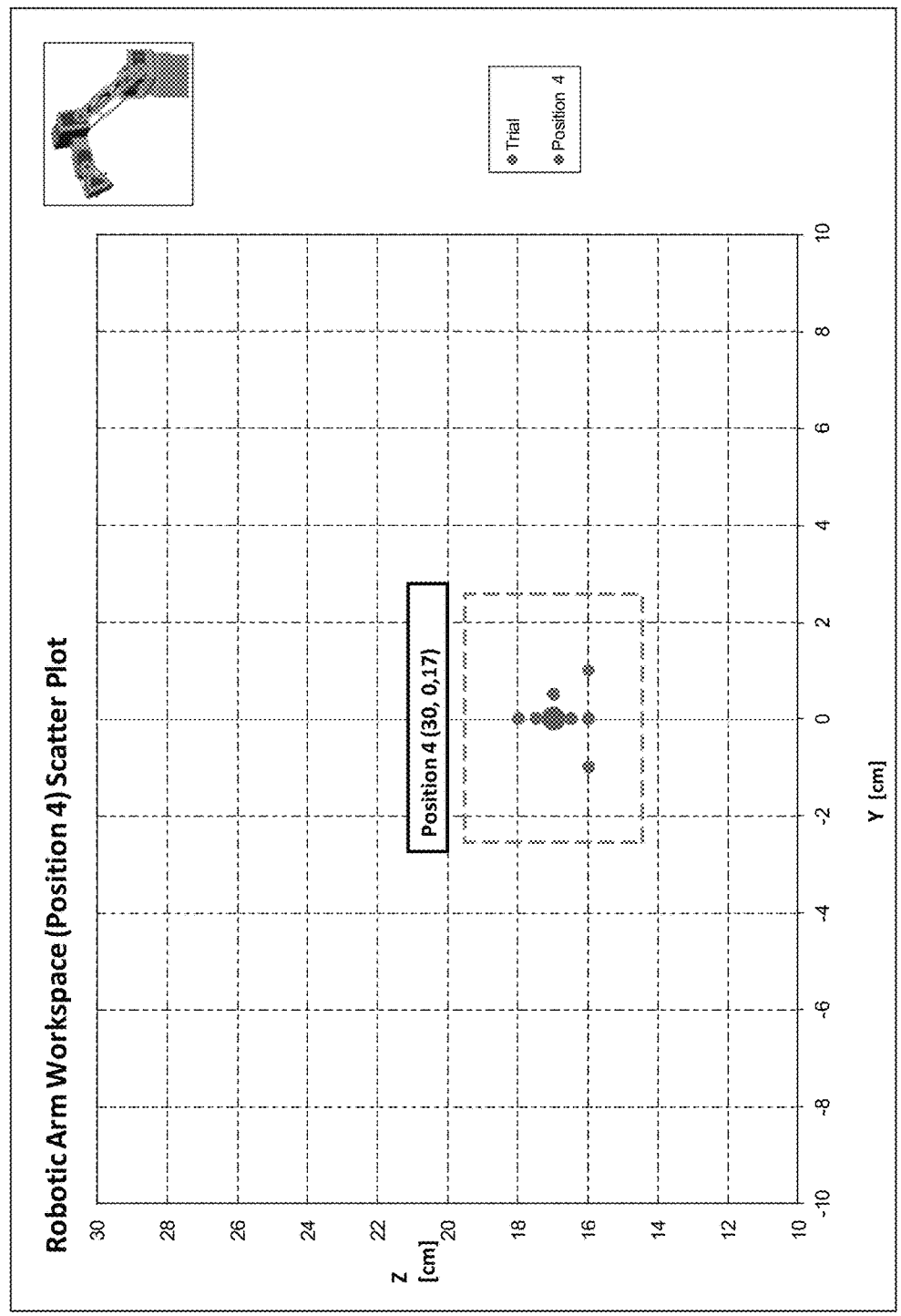
FIG. 31 is a pictorial representation of a kinematic positioning scatter plot (position 4)

The tangential force required to remove a peach blossom from a fruit-producing shoot was simulated using the dual brush end-effector prototype. The end-effector provided the centripetal motion for the tangential force acting on the blossom. The Saturn peach cultivar was selected for this test series. The tangent of the end-effector brush bristles was placed on the surface of the Saturn blossom and increased linearly until full detachment. The time and angular velocity were concurrently recorded. After 30 test runs, the average calculated tangential force required to remove a blossom from a shoot was approximately 0.62 N (0.14 lbf), with a confidence level of 95% and a margin of error of +/−18% giving a range of 0.49 N to 0.71 N (0.11 lbf-0.16 lbf). FIG. 25 shows a sample force graph calculated after testing. The y axis is the force in pound force and the x axis is the time duration in seconds of the sample.

The resultant of the blossom force test gives us a range of 0.44 N to 0.57 N (0.10 lbf-0.13 lbf) for the normal force and 0.49 N to 0.71 N (0.11-0.16 lbf) for the tangential force. The end-effector has a tangential force capability of 5.3 N (1.19 lbf) at the brush blossom interface. The robotic arm can deliver a torque >44 N (10 lbf) at the brush blossom interface. Thus, the robotic arm with end-effector can effectively remove peach buds and/or blossoms from a branch or shoot.

Kinematic Data Analysis

Figure 32:
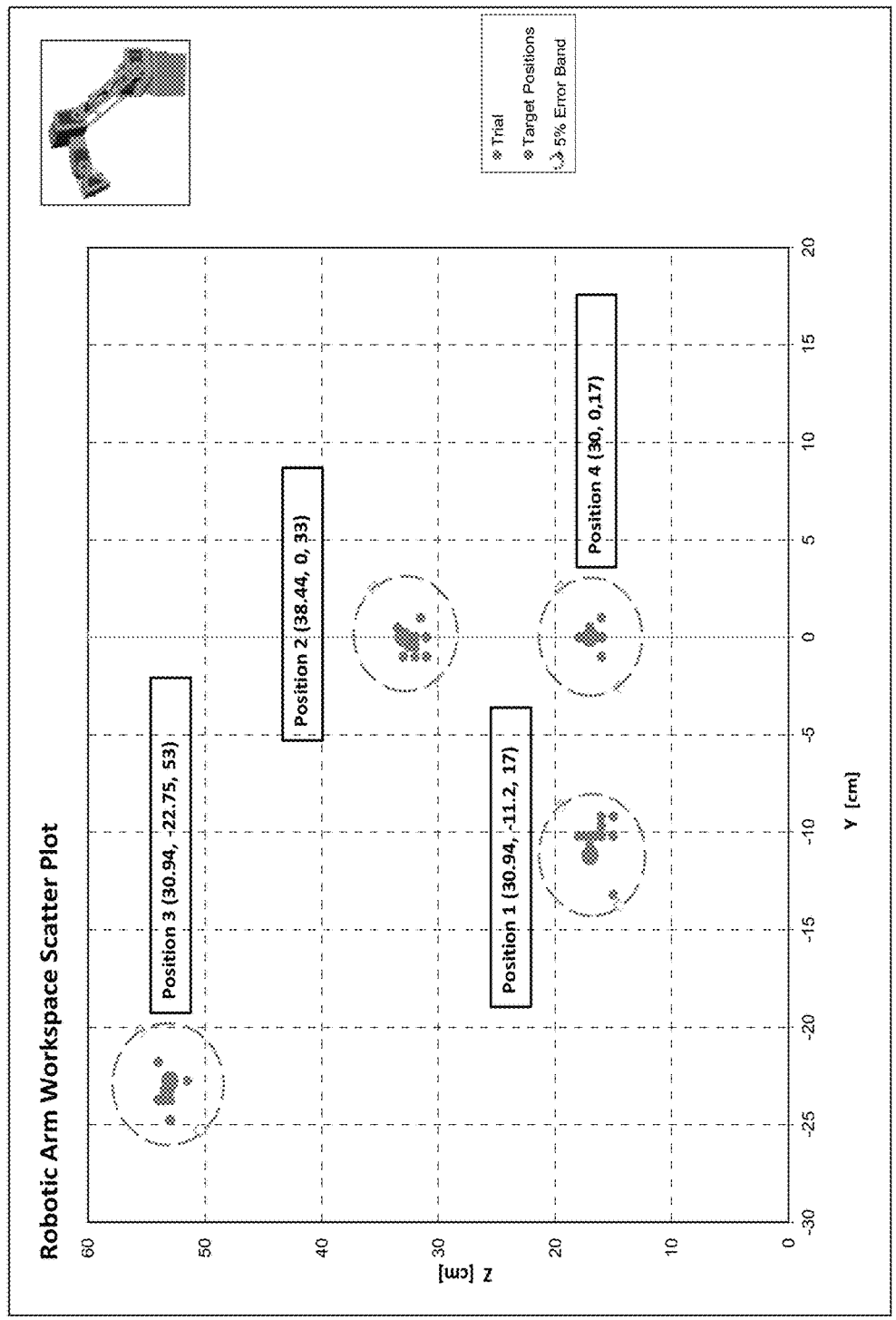
FIG. 32 is a pictorial representation of a kinematic positioning scatter plot (position 1-4)

In this analysis, the precision and accuracy of the robotic arm placement was studied. The robotic arm's kinematic algorithm was programmed with four 3D target coordinates. The testing algorithm then placed the robotic arm at each position in a random order. The robotic arm placement 3D distance from each target position was measured and recorded. The kinematic positioning test consisted of 120 repetitions, 30 trials at each location. FIGS. 28 through 31 show the scatter plot for each position. The positions are represented in a 2D graphical form for simplification. The x and y axis of the graph are the y and z axis, respectively, of the robotic workspace. The x axis can be considered into the figure and is noted above each target. The highlighted dot on each figure represents the target location in 2D space. The dashed red line represents a 5% error band around the target. Each trial run was represented by a blue dot. FIG. 32 presents the complete kinematic positioning test.

Figure 33:
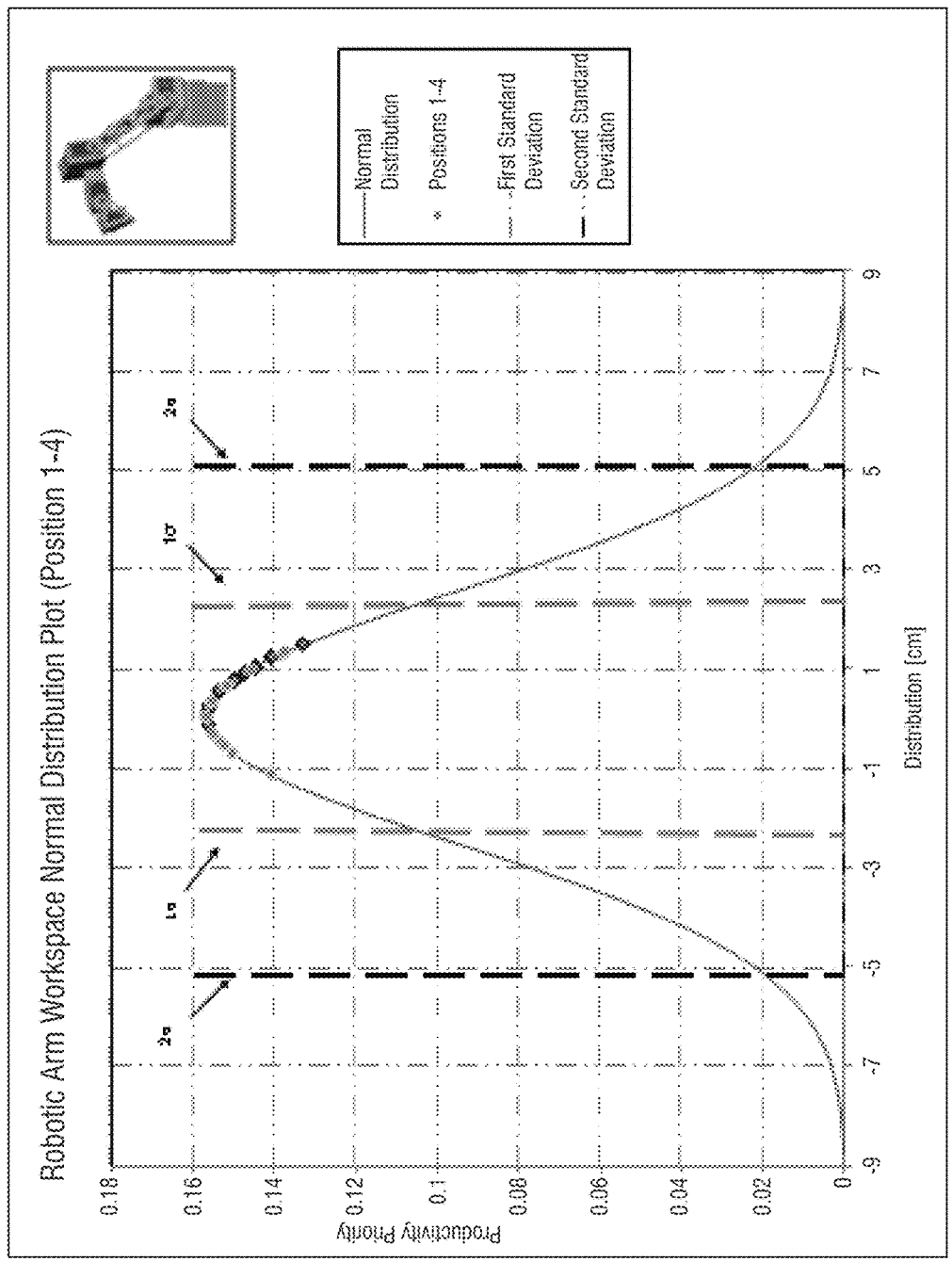
FIG. 33 is a pictorial representation of a normal distribution curve for kinematic positioning test (position 1-4, 120 trials)
Figure 34:
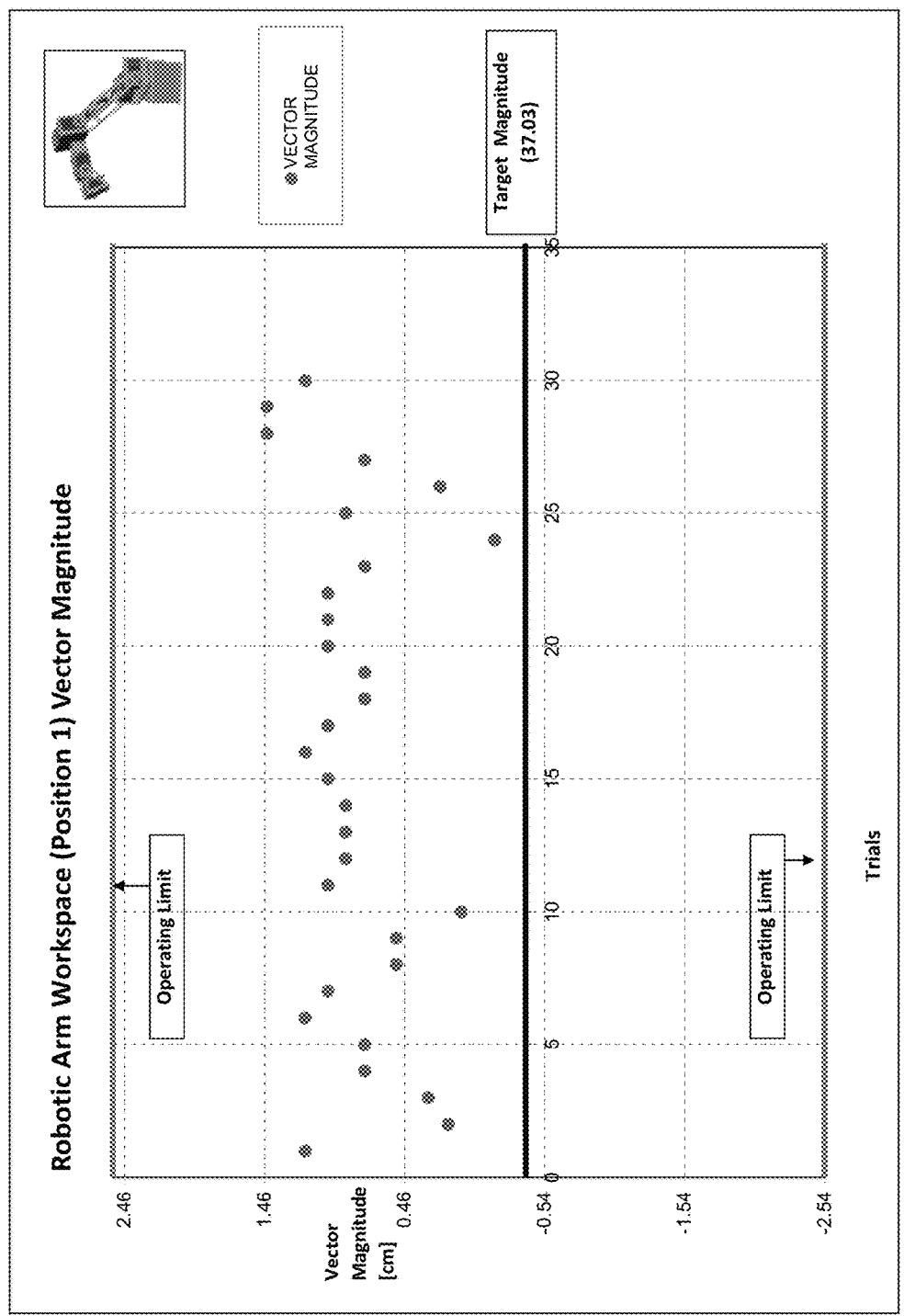
FIG. 34 is a pictorial representation of a vector magnitude plot for kinematic positioning test (position 1)

For positions 1 to 4, the resultant 120 test repetitions fell within the first standard deviation of the proposed +/−2.54 cm (1 in), (FIG. 33). With a confidence level of 95% and a margin of error of +/−8.96%, the robotic arm has a consistent range of −1.26 cm (0.496 in) to +1.57 cm (0.618 in) vector magnitude per target location. As seen in FIG. 34, the vector magnitude for each trial was well within the operating conditions set for the robotic arm. Therefore, the end-effector was attached to the robotic arm for further testing.

End-Effector Positioning Analysis

Figure 35:
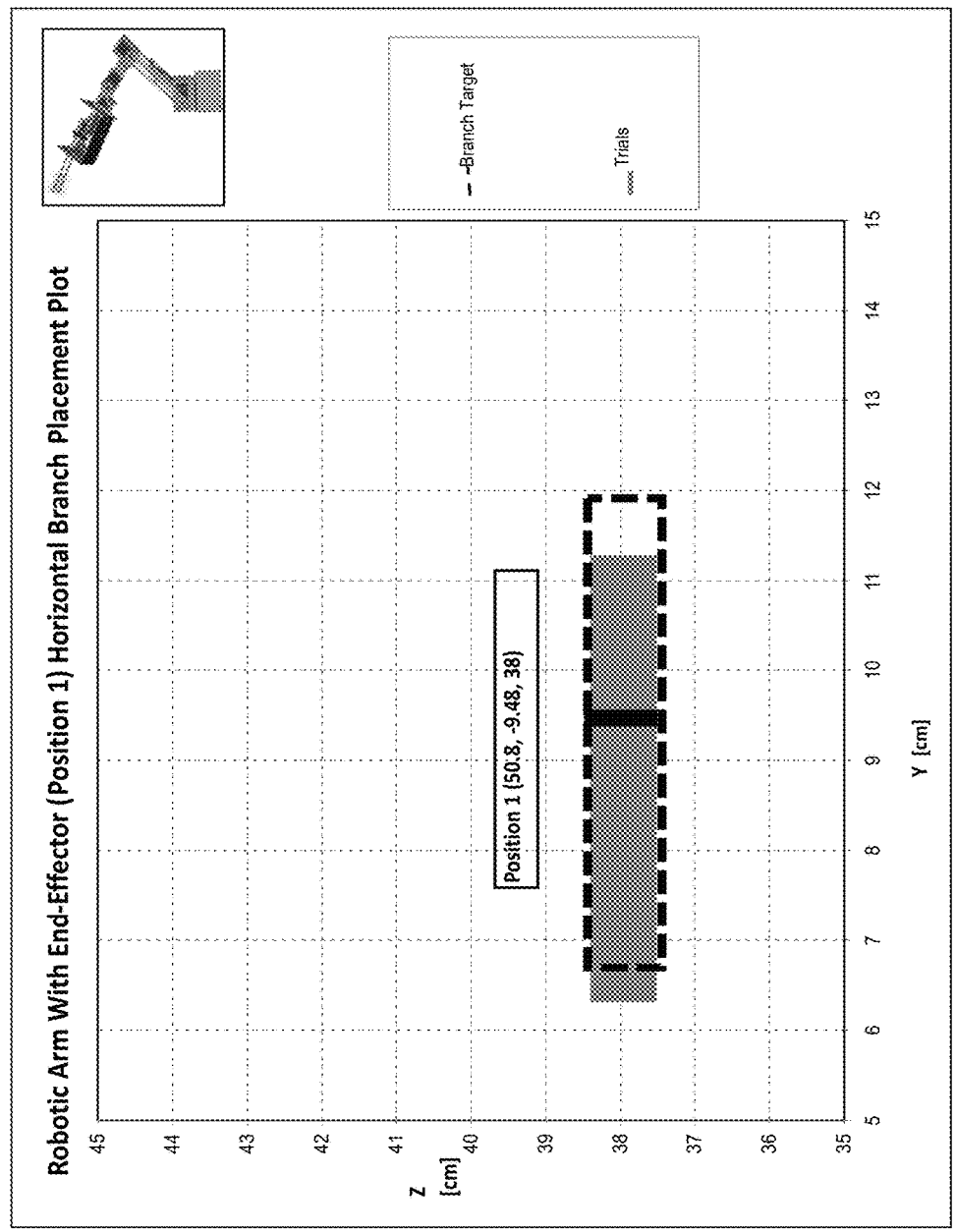
FIG. 35 is a pictorial representation of an end-effector placement plot (position 1)
Figure 36:
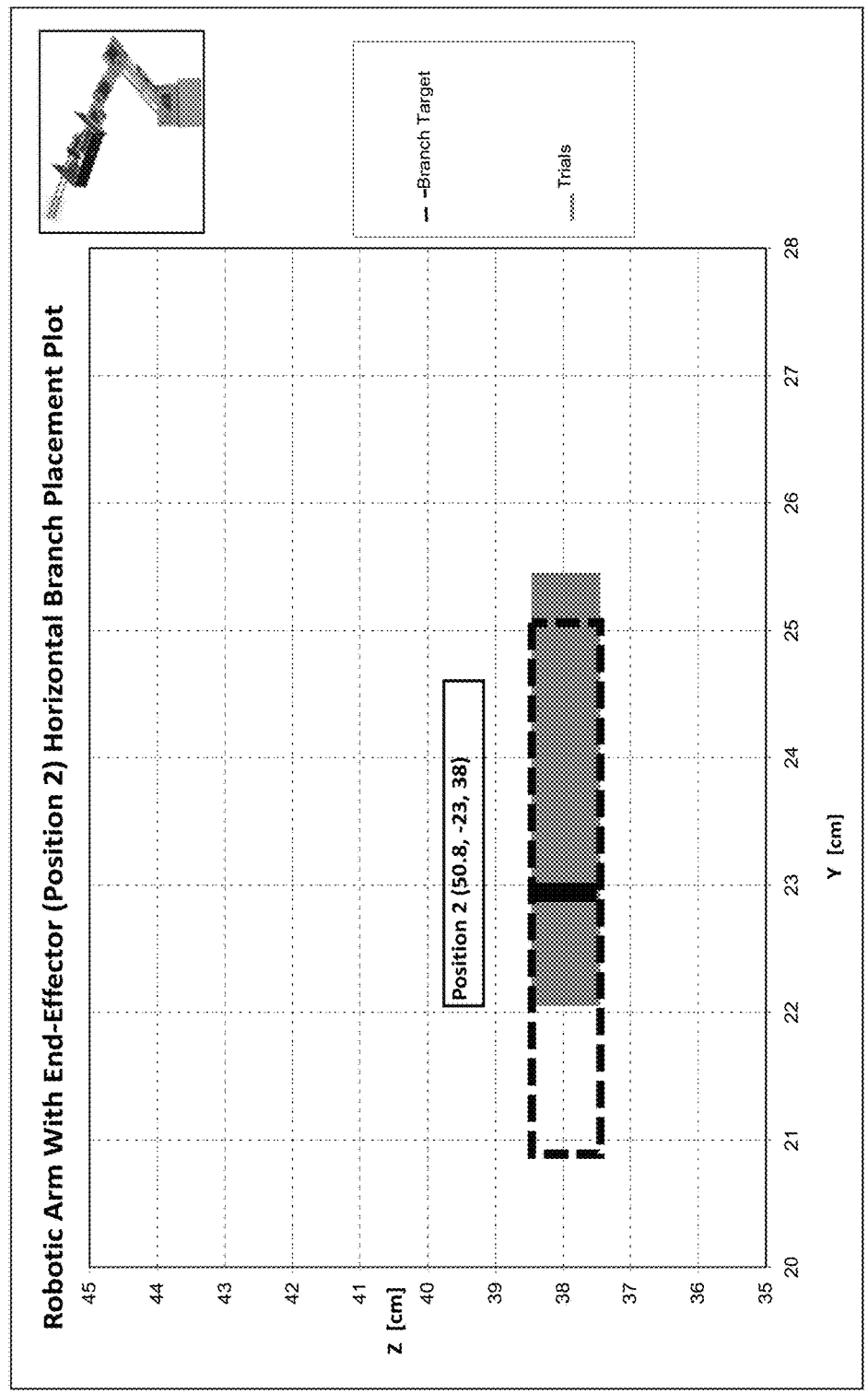
FIG. 36 is a pictorial representation of an end-effector placement plot (position 2)
Figure 37:
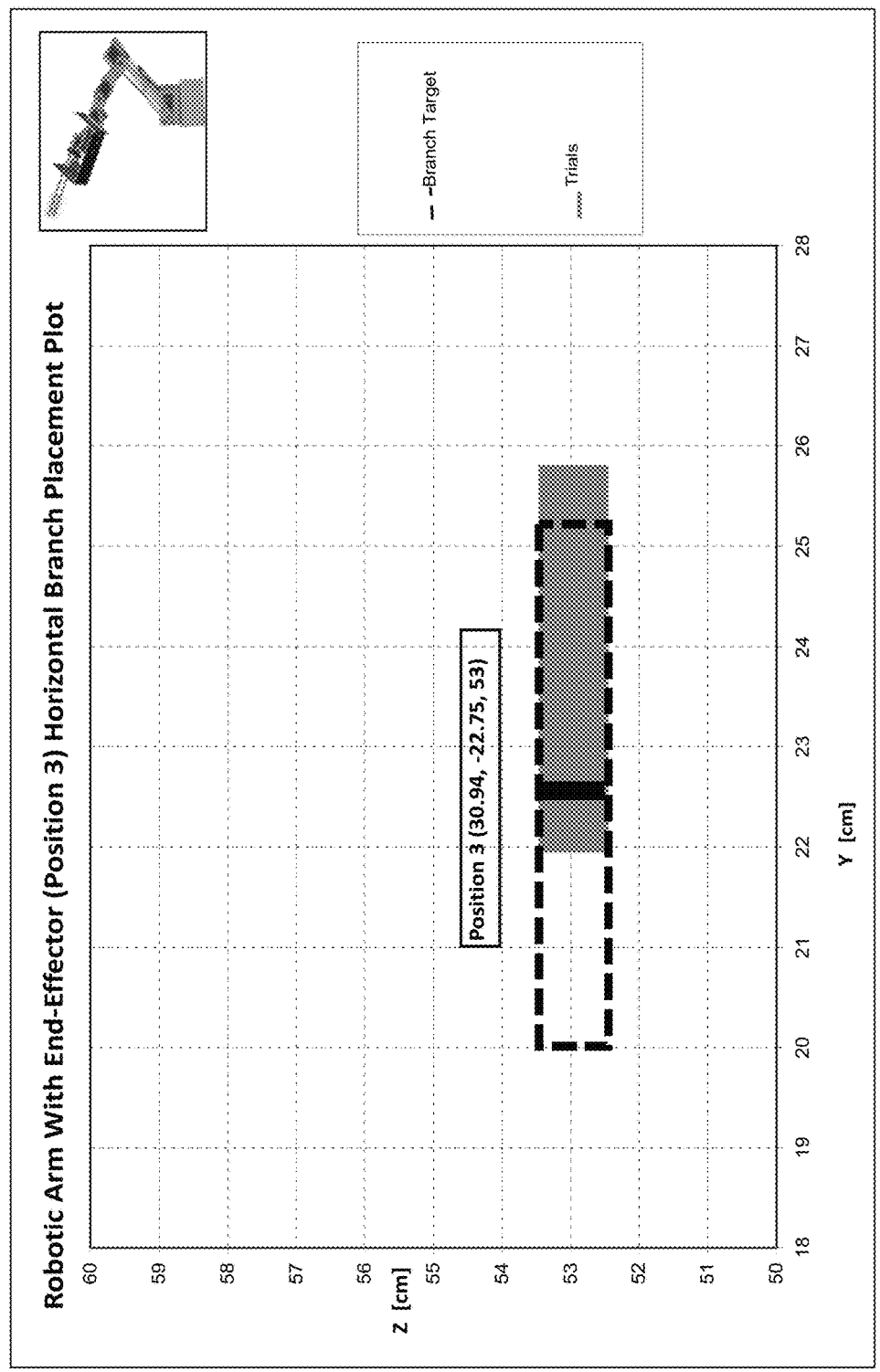
FIG. 37 is a pictorial representation of an end-effector placement plot (position 3)
Figure 38:
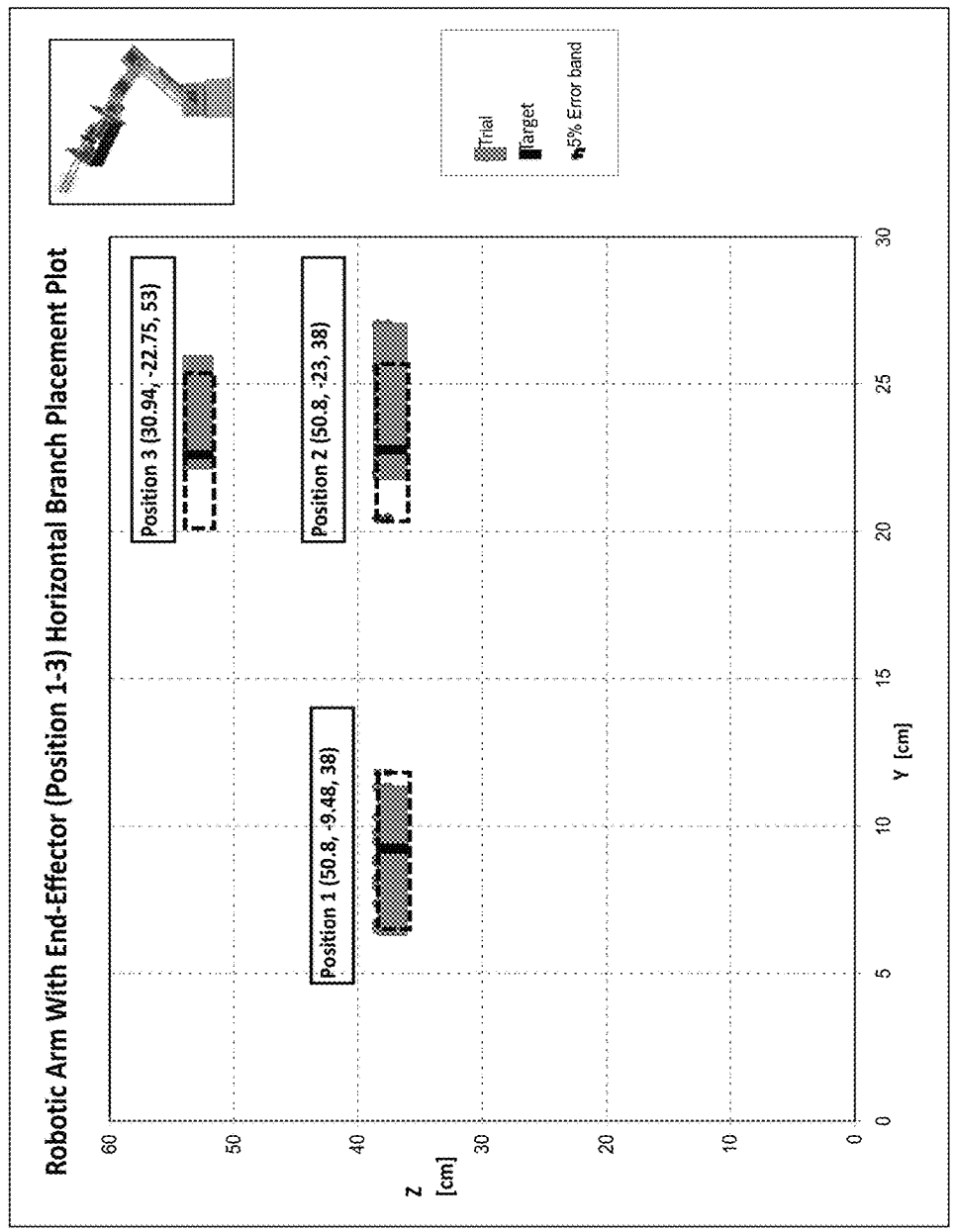
FIG. 38 is a pictorial representation of an end-effector placement plot (position 1-4)

For the end-effector positioning test, three target positions were chosen within the robotic arm workspace. The robotic arm kinematic software was then programmed with the three target coordinates. The end-effector brushes were set at a 90° angle perpendicular to the branches. End-effector brushes were open at a distance of 1.905 cm (0.75 in) as the robotic arm moved into position. The testing algorithm placed the robotic arm and end-effector at each position in a random order. The center of rotation of the end-effector brushes was measured from target and recorded. The end-effector positioning test consisted of 30 trials at each location for a total of 90 repetitions. FIGS. 35 through 37 show the bar graph for each position. The positions are represented in a 2D graphical form for simplification. The x and y axis of the graph are the y and z axis respectively of the robotic workspace. The x axis can be considered into the figure and is noted above each target. The black bar on each figure represents the target location in 2D space. The dashed black line represents a 5% error band around the target. Each trial run was represented with a red bar.

For positions 1 to 3 the brushes reached the proposed +/−2.54 cm (1 in) target area 100% of the time. The deviation from target to the center of the brushes were within the first standard deviation with a confidence level of 95% and a margin of error of +/−10.33%, the end-effector brushes have a consistent range of −2.97 cm (−1.1 in) to +3.04 cm (+1.2 in) per target location. Note, it was observed that as the robotic arm and end effector transverses further in the +/−y direction, the brushes reached the target area at an angle. The angle had no effect on the target area and brush surface area or interface and was neglected. It was noted here for possible concerns and corrections to a larger scale model. The angle can be calculated and corrected in the kinematic software.

Heuristic Thinning Data Analysis

A major objective of this was to investigate selective thinning of peach blossoms. A selective spatial thinning heuristic algorithm was tested. The heuristic test consisted of a series of branches that varied in length from 10 cm (3.93 in), 15 cm (5.90 in) and 20 cm (7.87 in) along the y axis, with three artificial blossoms placed approximately every 5 cm (1.96 in). The end-effector was moved into position and removed the blossom according to the spatial thinning algorithm. The blossom positions with and without blossoms were then counted and recorded. The heuristic thinning test consisted of 10 trials per length for a total of 30 repetitions.

Figure 39:
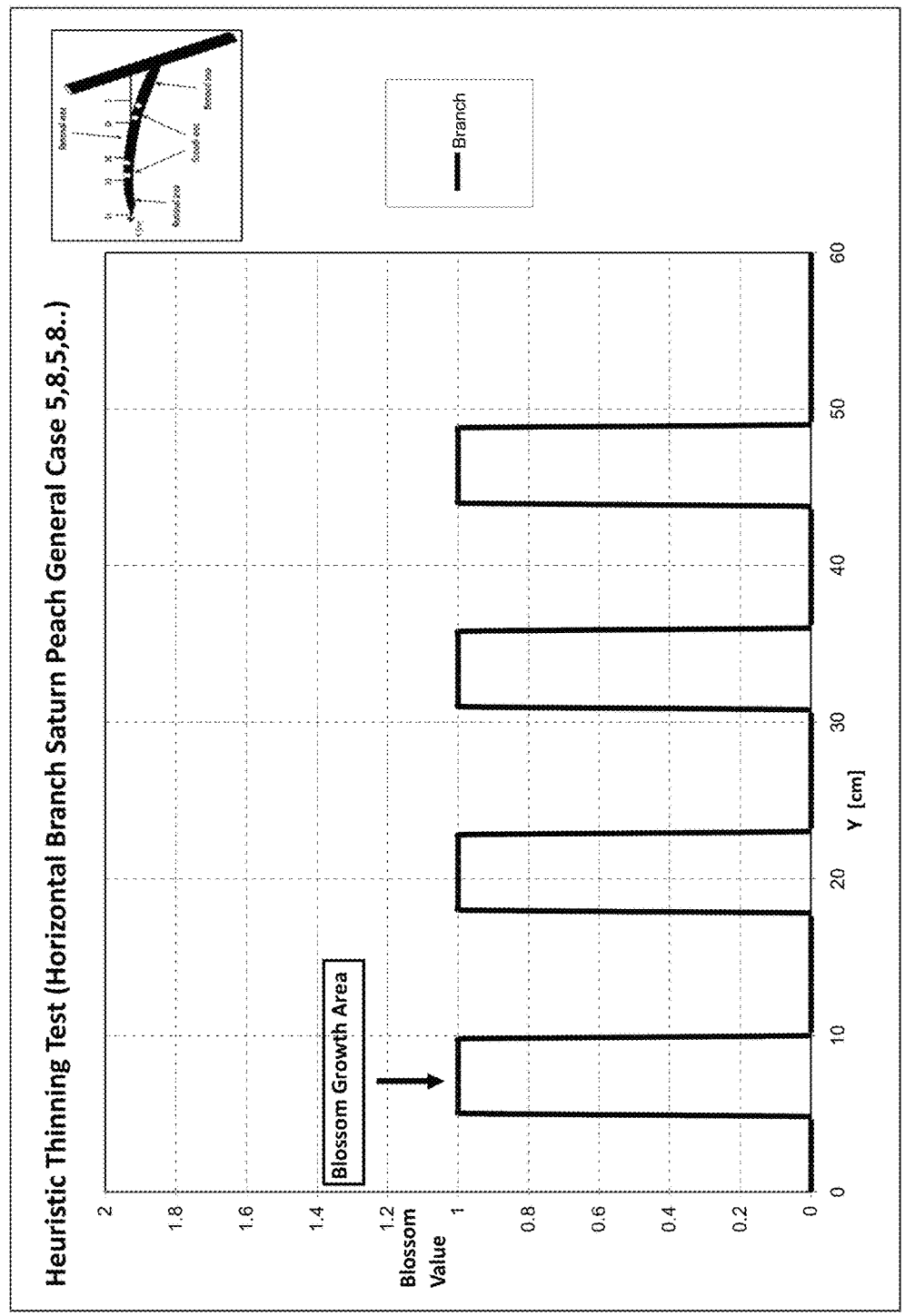
FIG. 39 is a pictorial representation of a heuristic thinning sample trace.

A Boolean, or true-false approach was used for the heuristic analysis. A blossom position is considered a true or 1 value; a position without a blossom is a false or 0 reading. Therefore, we can create a sample trace based on the spatial thinning parameters set for the Saturn variety peach blossom. As seen in FIG. 39, the Saturn (5, 8, 5, 8 . . . ) general heuristic case gives us four growth areas on a maximum fruit-bearing branch of 60 cm. The test setup for the 20 cm (7.87 in) case can be seen FIG. 40.

Figure 40:
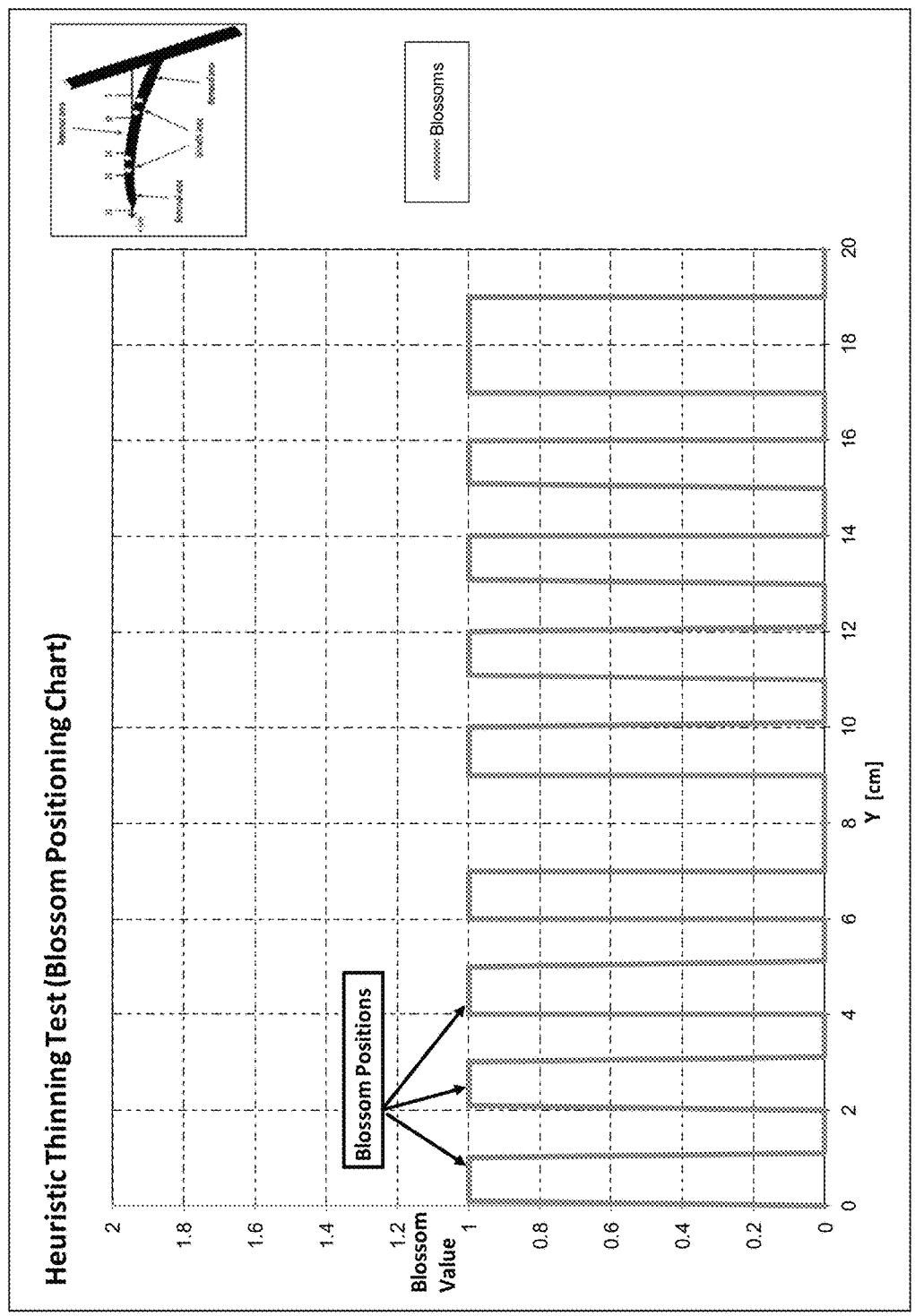
FIG. 40 is a pictorial representation of a heuristic thinning blossom position chart.
Figure 41:
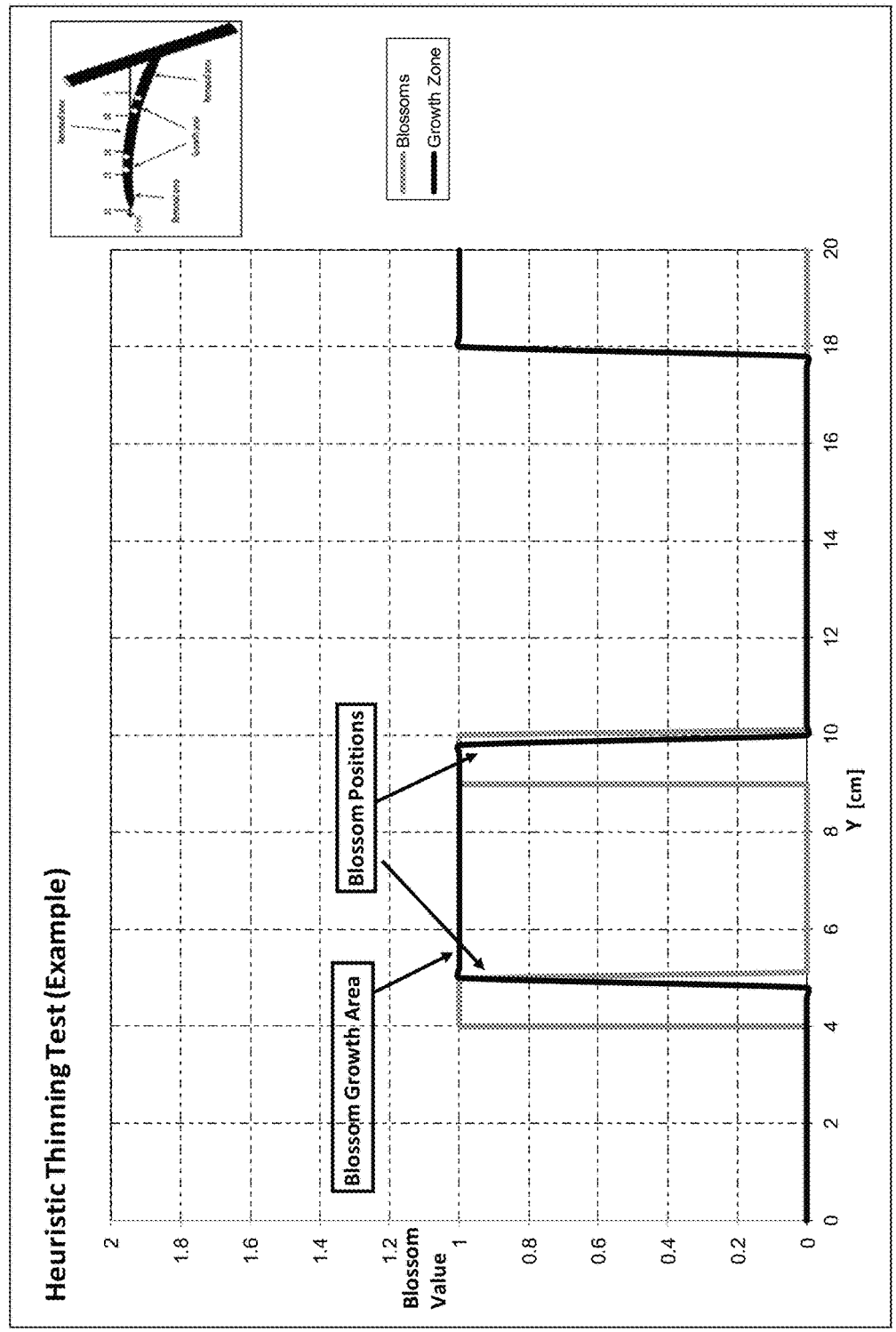
FIG. 41 is a pictorial representation of a heuristic thinning example.

When the heuristic thinning sample trace from FIG. 39 is transposed on to FIG. 40 the resulting blossom values should be in or around the designated growth zones. If the resultant blossom values are not in the growth zones the two closet blossoms to either side of the zone should be kept (FIG. 41). The Boolean analysis is a quantitative visual indication of selective thinning effectiveness.

An empirical formula was created in order to calculate the thinning heuristics. A percentage value was determined for each repetition (Equation (23)). The blossom thinning percentage BTP is a rating scale based on the length of shoot and blossom count. A 100% rating is a perfectly thinned peach shoot according to the spatial heuristics. A percentage greater than 100% is an over thinned shoot and a percentage lower than 100% is an under thinned branch.

$$BTP = \frac{BC}{2*\{Z\}(0.714*x)} \times 100\% \qquad (23)$$

Where,

BTP—Blossom Thinning Percentage

BC—Visual blossom count after heuristic thinning

{Z}=(0.7148*X) Z must be rounded to a Whole Number
X—Length of peach shoot in cm For the heuristic thinning tests of 10 cm (3.93 in), 15 cm (5.90 in) and 20 cm (7.87 in) the end-effector successfully removed the unwanted blossom in each case. The BTP for each case was 100%.

The present invention is not to be limited to the particular embodiments described herein. In particular, the present invention contemplates numerous variations in the type of ways in which embodiments of the invention may be applied to selective automated blossom thinning. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

What is claimed is:

1. A selective blossom thinning system, comprising:
   a robotic arm having proximal and distal portions articulable relative to each other by one or more interconnected members;
   an end-effector at the distal portion, the end-effector having one or more fruit blossom thinning elements movable in a linear direction between open and closed positions for receiving and removing selected fruit blossoms;
   an activation member to activate an agitation element of the one or more fruit blossom thinning elements of the end-effector to remove at least one of the selected fruit blossoms; and
   a free-spinning element attached to the agitation element to allow the agitation element to roll over branches or blossoms without applying a tangential or normal force while deactivated;
   said free-spinning element comprising a plurality of bristles extending therefrom to remove the blossoms by gripping and pulling the blossoms at least partially within the bristles.

2. The system of claim 1 further comprising:
   a rotary actuator in operable configuration with the end-effector.

3. The system of claim 1 further comprising:
   a linear actuator in operable configuration with the end-effector.

4. The system of claim 1 further comprising at least one input to a control on the arm from an acquisition device to position the end-effector proximate one or more fruit blossoms heuristically selected by a computer-executed algorithm for removal from a plurality of fruit blossoms.

5. The system of claim 4 wherein the acquisition device comprises video acquisition connected in operable communication with a computer executed algorithm.

6. The system of claim 1 wherein the one or more fruit blossom thinning elements comprise opposing pairs, the opposing pairs in at least partial contact with each other in the closed position.

7. The system of claim 1 further comprising:
   a carriage with a rotary-to-linear translation assembly having a rotary displacement input and a linear displacement output.

8. A selective blossom thinner comprising:
   a pair of opposing blossom thinning elements configured to spin and movable relative to one another in a linear direction, said pair of thinning elements configured to cause the removal of selected fruit blossoms while activated and to roll over branches or blossoms without applying a tangential or normal force while deactivated;
   wherein the pair of thinning elements comprise a plurality of bristles extending therefrom to remove the blossoms by gripping and pulling the blossoms at least partially within the bristles;
   a carriage having a linear transversal assembly and an element actuator assembly;
   a first position of the carriage wherein the pair of opposing blossom thinning elements are in at least partial contacting engagement;
   a second position of the carriage wherein the pair of opposing blossom thinning elements are separated; and
   a robotic arm operably connected to the carriage.

9. The blossom thinner of claim 8 wherein the robotic arm comprises proximal and distal portions articulable relative to each other by one or more interconnected members.

10. The blossom thinner of claim 8 wherein the linear transversal assembly comprises an actuated radial input and an actuated linear transversal output for movement between the first and second position.

11. The blossom thinner of claim 8 wherein the element actuator assembly comprises an actuated radial input and at least one actuated counter-radial output for imparting rotation to at least one of the pair of blossom thinning elements.

12. The blossom thinner of claim 8 wherein at least one of the pair of opposing blossom thinning elements is in contacting engagement with the element actuator assembly in both the first and second position of the carriage.

13. The blossom thinner of claim 8 wherein the pair of opposing blossom thinning elements are in contacting engagement with the element actuator assembly in both the first and second position.

14. The blossom thinner of claim 8 wherein the pair of opposing blossom thinning elements comprise opposing parallel brushes of a first clockwise rotating brush and a second counterclockwise rotating brush.

* * * * *